(12) United States Patent
Song et al.

(10) Patent No.: US 12,477,757 B2
(45) Date of Patent: Nov. 18, 2025

(54) CAPACITOR, SEMICONDUCTOR DEVICE COMPRISING THE CAPACITOR, AND METHOD OF FABRICATING THE CAPACITOR

(71) Applicant: Samsung Electronics Co., Ltd., Suwon-si (KR)

(72) Inventors: Jeonggyu Song, Seongnam-si (KR); Eunae Cho, Seoul (KR); Yongsung Kim, Suwon-si (KR); Boeun Park, Hwaseong-si (KR); Narae Han, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 371 days.

(21) Appl. No.: 18/156,273

(22) Filed: Jan. 18, 2023

(65) Prior Publication Data

US 2023/0299125 A1 Sep. 21, 2023

(30) Foreign Application Priority Data

Jan. 19, 2022 (KR) .................. 10-2022-0008030
Dec. 22, 2022 (KR) .................. 10-2022-0182169

(51) Int. Cl.
*H10D 1/68* (2025.01)
*H01G 4/10* (2006.01)

(52) U.S. Cl.
CPC .............. *H10D 1/696* (2025.01); *H01G 4/10* (2013.01)

(58) Field of Classification Search
CPC .......... H10D 1/696; H10D 1/68; H10D 1/684; H10D 1/716; H10B 12/033; H01G 4/10; H01G 4/1209; H01G 4/1272; H01G 4/012; H01G 4/085; H01G 4/1236; H01G 4/1254; H01G 4/008
See application file for complete search history.

(56) References Cited

U.S. PATENT DOCUMENTS

| | | |
|---|---|---|
| 6,924,519 B2 | 8/2005 | Itokawa et al. |
| 7,262,544 B2 | 8/2007 | Aoki et al. |
| 10,319,806 B2 | 6/2019 | Rodriguez et al. |
| 2007/0102742 A1* | 5/2007 | Kil ............... H01L 21/02194 257/295 |
| 2008/0003740 A1* | 1/2008 | Wunnicke ............ H10D 1/042 438/238 |
| 2008/0233762 A1* | 9/2008 | Hong ................ C23C 16/45531 438/763 |
| 2011/0038094 A1* | 2/2011 | Mori .................... H01G 4/33 427/80 |

(Continued)

FOREIGN PATENT DOCUMENTS

| | | | |
|---|---|---|---|
| CN | 112018035 A | * 12/2020 | ......... H10D 30/62 |
| JP | H9-116111 A | 5/1997 | |

(Continued)

*Primary Examiner* — Scott B Geyer
(74) *Attorney, Agent, or Firm* — Harness, Dickey & Pierce, P.L.C.

(57) ABSTRACT

A capacitor includes a lower electrode, an upper electrode, a dielectric film between the lower electrode and the upper electrode, and a leakage current reduction film between the upper electrode and the dielectric film. The leakage current reduction film includes a doped AlZrO film, wherein an ionic radius of a dopant contained in the doped AlZrO film is greater than or equal to about 130 picometers (pm).

27 Claims, 23 Drawing Sheets

(56) References Cited

U.S. PATENT DOCUMENTS

| | | | |
|---|---|---|---|
| 2011/0163452 A1* | 7/2011 | Horii | H10D 64/691 |
| | | | 257/E23.141 |
| 2012/0149193 A1* | 6/2012 | Fujiwara | C23C 16/40 |
| | | | 257/E21.28 |
| 2013/0208403 A1* | 8/2013 | Rocklein | H01L 21/02159 |
| | | | 361/321.5 |
| 2015/0061074 A1 | 3/2015 | Lee et al. | |
| 2015/0171179 A1* | 6/2015 | Horii | H10D 1/692 |
| | | | 257/761 |
| 2016/0133691 A1* | 5/2016 | Phatak | H10B 12/03 |
| | | | 257/532 |
| 2020/0020780 A1* | 1/2020 | Kim | H10D 64/691 |
| 2021/0265458 A1 | 8/2021 | Song et al. | |
| 2021/0280720 A1 | 9/2021 | Lee et al. | |
| 2022/0140066 A1 | 5/2022 | Lee et al. | |
| 2022/0140067 A1* | 5/2022 | Song | H01G 4/008 |
| | | | 257/288 |
| 2022/0310776 A1* | 9/2022 | Wong | C23C 8/16 |

FOREIGN PATENT DOCUMENTS

| | | | | |
|---|---|---|---|---|
| JP | 2010-080311 A | 4/2010 | | |
| KR | 10-2131078 B1 | 8/2020 | | |
| KR | 20200133242 A * | 11/2020 | | H01M 10/38 |
| KR | 10-2021-0108736 A | 9/2021 | | |
| KR | 10-2021-0111625 A | 9/2021 | | |
| WO | WO-2021261868 A1 * | 12/2021 | | H10D 1/711 |

\* cited by examiner

CAPACITOR, SEMICONDUCTOR DEVICE COMPRISING THE CAPACITOR, AND METHOD OF FABRICATING THE CAPACITOR

CROSS-REFERENCE TO RELATED APPLICATIONS

This application is based on and claims priority under 35 U.S.C. § 119 to Korean Patent Application No. 10-2022-0008030, filed on Jan. 19, 2022 and No. 10-2022-0182169, filed on Dec. 22, 2022, in the Korean Intellectual Property Office, the disclosures of which are incorporated by reference herein in their entireties.

BACKGROUND

1. Field

The present disclosure relates to a capacitor, a semiconductor device, and a method of fabricating the capacitor.

2. Description of the Related Art

With down-scaling of the integrated circuit device, the space available for capacitors are also reduced. Capacitors include upper and lower electrodes and a dielectric film therebetween, and a high-permittivity dielectric material is used for the capacitors to show high capacitance. Leakage current may flow in the capacitor. To accommodate the demand for smaller capacitors, techniques for minimizing capacitance reduction while reducing the leakage current flowing in the capacitor is required.

SUMMARY

Provided is a capacitor having superior leakage current blocking characteristics and high capacitance.

Provided is a semiconductor device including a capacitor having superior leakage current blocking characteristics and high capacitance.

Provided is a method of fabricating a capacitor having superior leakage current blocking characteristics and high capacitance.

However, goals to be achieved are not limited to the above disclosure.

Additional aspects will be set forth in part in the description which follows and, in part, will be apparent from the description, or may be learned by practice of the presented embodiments of the present disclosure.

According to an aspect of an embodiment, a capacitor includes a lower electrode; an upper electrode; a dielectric film between the lower electrode and the upper electrode; and a leakage current reduction film between the upper electrode and the dielectric film, the leakage current reduction film comprising a doped AlZrO film, and wherein an ionic radius of a dopant included in the doped AlZrO film is greater than or equal to about 130 picometers (pm).

The leakage current reduction film may include zirconium (Zr) at about 75 at % or more of metal atoms except included in the leakage current reduction film.

The dopant may include at least one selected from among potassium (K), rubidium (Rb), cesium (Cs), strontium (Sr), barium (Ba), neodymium (Nd), samarium (Sm), europium (Eu), francium (Fr), or radium (Ra).

The capacitor may further include a lower interfacial film between the lower electrode and the dielectric film, in which the lower interfacial film includes a material expressed as MM'ON, M'O, or M'ON. M may include at least one of beryllium (Be), boron (B), sodium (Na), magnesium (Mg), aluminum (Al), silicon (Si), potassium (K), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), rubidium (Rb), strontium (Sr), yttrium (Y), zirconium (Zr), niobium (Nb), molybdenum (Mo), technetium (Tc), ruthenium (Ru), rhodium (Rh), palladium (Pd), silver (Ag), cadmium (Cd), indium (In), tin (Sn), antimony (Sb), tellurium (Te), cesium (Cs), barium (Ba), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), Ytterbium (Yb), lutetium (Lu), hafnium (Hf), tantalum (Ta), tungsten (W), rhenium (Re), osmium (Os), iridium (Ir), platinum (Pt), gold (Au), mercury (Hg), thallium (Tl), lead (Pb), bismuth (Bi), polonium (Po), francium (Fr), radium (Ra), actinium (Ac), thorium (Th), protactinium (Pa), or uranium (U), and M' may include at least one of hydrogen (H), lithium (Li), Be, B, N, O, Na, Mg, Al, Si, phosphorus (P), sulfur (S), K, Ca, Sc, Ti, V, Cr, Mn, Fe, Co, Ni, Cu, Zn, Ga, Ge, arsenic (As), selenium (Se), Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, or U.

The capacitor may further include an upper interfacial film between the leakage current reduction film and the upper electrode, in which the upper interfacial film includes a material expressed as M'O and M'ON.

A total thickness of the dielectric film and the leakage current reduction film may be about 20 angstroms (Å) to about 80 Å.

A thickness of the dielectric film may be about one and a half (1.5) times a thickness of the leakage current reduction film.

The leakage current reduction film may include the dopant and Al at about 25% or less of metal atoms included in the leakage current.

The doped AlZrO may be represented by $(L_1)nAl_xZr_yO_{(0.5n+1.5x+2y)}$, $(L_2)_mAl_xZr_yO_{(m+1.5x+2y)}$, or $(L_1)_n(L_2)_mAl_xZr_yO_{(0.5n+m+1.5x+2y)}$, wherein $L_1$ is one of K, Rb, Cs, and Fr, $L_2$ is one of Sr, Ba, and Ra, where in x, y, n and m respectively represent an atomic percentage of the metal atoms in the doped AlZrO, and wherein $0<(n+x)\leq 0.25$, $0<(m+x)\leq 0.25$, $0<(n+m+x)\leq 0.25$ and $0.75\leq y<1$.

The dielectric film may include at least one of $HfO_2$, $ZrO_2$, $CeO_2$, $La_2O_3$, $Ta_2O_3$, or $TiO_2$. The lower electrode may include a carbon content of 1% or less.

Each of the lower electrode and the upper electrode may include at least one TiN, MoN, CoN, TaN, W, Ru, $RuO_2$, Ir, $IrO_2$, Pt, PtO, SRO($SrRuO_3$), BSRO(($Ba,Sr$)$RuO_3$), CRO ($CaRuO_3$), LSCO(($La,Sr$)$CoO_3$), or a combination thereof.

According to an aspect of an embodiment, a method of fabricating a capacitor includes forming a lower electrode, forming a dielectric film on the lower electrode, forming a leakage current reduction film on the dielectric film, the leakage current reduction film comprising a doped AlZrO film, and forming an upper electrode on the leakage current reduction film, wherein an ionic radius of a dopant contained in the doped AlZrO film is greater than or equal to about 130 picometers (pm).

The forming of the leakage current reduction film may include forming a lower $Al_2O_3$ film, a dopant film, a $ZrO_2$ film, and an upper $Al_2O_3$ film on the dielectric film and heat-treating the dielectric film, the lower $Al_2O_3$ film, the dopant film, the $ZrO_2$ film, and the upper $Al_2O_3$ film, and wherein the dopant film may include an oxide film including the dopant.

The lower $Al_2O_3$ film is formed to a thickness of about 1 to about 3 angstroms (Å), and a thickness of the dopant film is formed to a thickness of about 1 to about 2 Å, and a thickness of the $ZrO_2$ film is formed to a thickness of about 20 to about 100 Å, and a thickness of the upper $Al_2O_3$ film is formed to a thickness of about 1 to about 3 Å.

The leakage current reduction film may include Zr at about 75 at % or more among metal atoms included in the leakage current reduction film.

The dopant may include at least one selected from among K, Rb, Cs, Sr, Ba, Nd, Sm, Eu, Fr, and Ra.

The method may further include forming a lower interfacial film provided between the lower electrode and the dielectric film, in which the lower interfacial film includes a material expressed as MM'ON, M'O, or M'ON, in which M includes at least one of Be, B, Na, Mg, Al, Si, K, Ca, Sc, Ti, V, Cr, Mn, Fe, Co, Ni, Cu, Zn, Ga, Ge, Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, and U, and M' includes at least one of H, Li, Be, B, N, O, Na, Mg, Al, Si, P, S, K, Ca, Sc, Ti, V, Cr, Mn, Fe, Co, Ni, Cu, Zn, Ga, Ge, As, Se, Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, and U.

The method may further include forming an upper interfacial film provided between the leakage current reduction film and the upper electrode, in which the upper interfacial film includes a material expressed as M'O or M'ON.

According to an aspect of another embodiment, a semiconductor device includes a substrate, a gate structure provided on the substrate, a first source/drain region and a second source/drain region provided in an upper portion of the substrate, and a capacitor provided on the substrate, in which the capacitor includes a lower electrode electrically connected to the first source/drain region, an upper electrode provided on the lower electrode, a dielectric film provided between the lower electrode and the upper electrode, and a leakage current reduction film provided between the upper electrode and the dielectric film, the leakage current reduction film includes a doped AlZrO film, and an ionic radius of a dopant contained in the doped AlZrO film is greater than or equal to about 130 picometers (pm).

The leakage current reduction film may include Zr of about 75 at % or more among metal atoms, except for O, included in the leakage current reduction film.

The dopant may include at least one selected from among K, Rb, K, Rb, Cs, Sr, Ba, Nd, Sm, Eu, Fr, or Ra.

The semiconductor device may further include a lower interfacial film between the lower electrode and the dielectric film, in which the lower interfacial film includes a material expressed as MM'ON, M'O, or M'ON, in which M includes at least one of Be, B, Na, Mg, Al, Si, K, Ca, Sc, Ti, V, Cr, Mn, Fe, Co, Ni, Cu, Zn, Ga, Ge, Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, or U; and M' includes at least one of H, Li, Be, B, N, O, Na, Mg, Al, Si, P, S, K, Ca, Sc, Ti, V, Cr, Mn, Fe, Co, Ni, Cu, Zn, Ga, Ge, As, Se, Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, or U.

The semiconductor device may further include an upper interfacial film between the leakage current reduction film and the upper electrode, in which the upper interfacial film includes a material expressed as M'O or M'ON.

A total thickness of the dielectric film and the leakage current reduction film may be about 20 angstroms (Å) to about 80 Å.

A thickness of the dielectric film may be about 1.5 times a thickness of the leakage current reduction film.

The leakage current reduction film may include the dopant and Al at about 25% or less in total among metal atoms, except for O, included in the leakage current reduction film.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
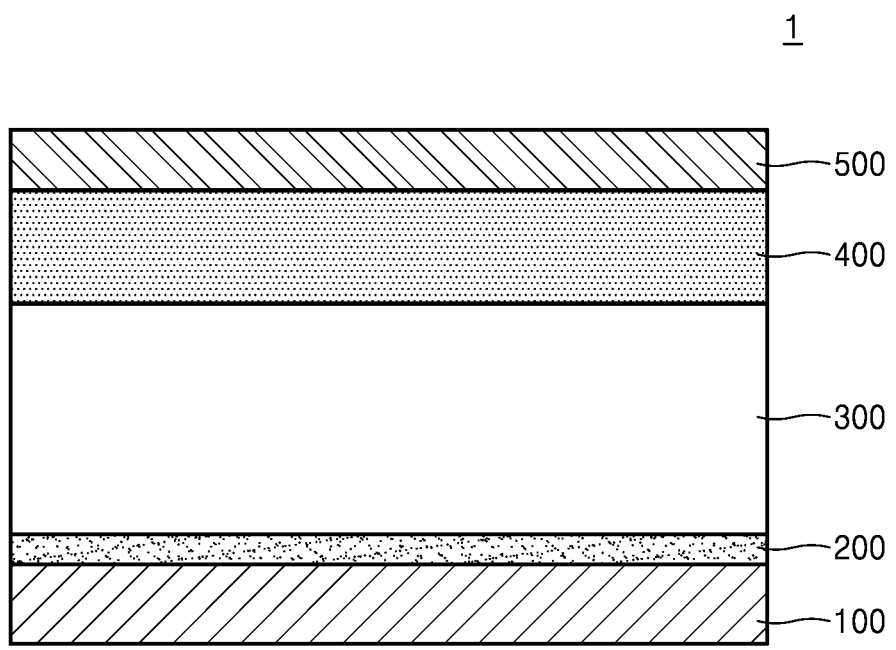
FIG. 1 is a cross-sectional view of a capacitor according to at least one example embodiment.

Hereinafter, example embodiments of the present disclosure will be described in detail with reference to the accompanying drawings. In the drawings, like reference numerals denote like components, and sizes of components in the drawings may be exaggerated for convenience of explanation. Meanwhile, embodiments to be described are merely examples, and various modifications may be made from such embodiments. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

An expression such as "on" may include not only the meaning of "immediately on in a contact manner", but also the meaning of "on in a non-contact manner". For example, when an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Spatially relative terms, such as "lower," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, the device may be otherwise oriented (rotated 90 degrees or at other orientations) and the spatially relative descriptors used herein interpreted accordingly.

Singular forms may include plural forms unless contextually and/or explicitly indicated otherwise. When a portion is referred to as "comprises" a component, the portion may not exclude another component and/or may further include another component unless stated otherwise.

When the terms "about" or "substantially" are used in this specification in connection with a numerical value, it is intended that the associated numerical value includes a manufacturing tolerance (e.g., ±10%) around the stated numerical value. Further, regardless of whether numerical values are modified as "about" or "substantially," it will be understood that these values should be construed as including a manufacturing or operational tolerance (e.g., ±10%) around the stated numerical values.

FIG. 1 is a cross-sectional view of a capacitor according to at least one example embodiment.

Referring to FIG. 1, a capacitor 1 may be provided. The capacitor 1 may include a lower electrode 100, a lower interfacial film 200, a dielectric film 300, a leakage current reduction film 400, and an upper electrode 500. A material of the lower electrode 100 may be selected for conductivity as an electrode and to maintain stable capacitance performance even after a high-temperature process in a process of fabricating the capacitor 1. In some example embodiments, the lower electrode 100 may include at least one of a metal, a conductive metal nitride, a conductive metal oxide, a combination thereof, and/or the like. For example, the lower electrode 100 may include at least one of TiN, MoN, CoN, TaN, W, Ru, $RuO_2$, Ir, $IrO_2$, Pt, PtO, SRO($SrRuO_3$), BSRO (($Ba,Sr)RuO_3$), CRO($CaRuO_3$), LSCO(($La,Sr)CoO_3$), a combination thereof, and/or the like.

In at least some embodiments, the lower electrode 500 may include, for example, a metal nitride expressed as MM'N. Herein, M is a metal element, M' is an element that is different from M, and N is nitrogen. The metal nitride of the lower electrode 100, MM'N, may be expressed as a metal nitride MN doped with an element M'. M' is an element that is different from M, and may be metal, but may also be an element (or material) other than metal.

M may include at least one of beryllium (Be), boron (B), sodium (Na), magnesium (Mg), aluminum (Al), silicon (Si), potassium (K), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), rubidium (Rb), strontium (Sr), yttrium (Y), zirconium (Zr), niobium (Nb), molybdenum (Mo), technetium (Tc), ruthenium (Ru), rhodium (Rh), palladium (Pd), silver (Ag), cadmium (Cd), indium (In), tin (Sn), antimony (Sb), tellurium (Te), caesium (Cs), barium (Ba), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), Ytterbium (Yb), lutetium (Lu), hafnium (Hf), tantalum (Ta), tungsten (W), rhenium (Re), osmium (Os), iridium (Ir), platinum (Pt), gold (Au), mercury (Hg), thallium (Tl), lead (Pb), bismuth (Bi), polonium (Po), francium (Fr), radium (Ra), actinium (Ac), thorium (Th), protactinium (Pa), uranium (U), and/or the like.

M' may include at least one of hydrogen (H), lithium (Li), Be, B, N, O, Na, Mg, Al, Si, phosphorus (P), sulfur (S), K, Ca, Sc, Ti, V, Cr, Mn, Fe, Co, Ni, Cu, Zn, Ga, Ge, arsenic (As), selenium (Se), Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, and U. In at least some embodiments, when a composition ratio of M, M', and N is represented by a:b:c in the metal nitride $M_aM'_bN_c$, $0<a\leq2$, $0<b\leq2$, and $0<c\leq4$ may be satisfied. Electrical characteristics, as well as electrical conductivity, of the capacitor 1 may vary with the composition ratio of M, M', and N. This composition may be a factor affecting a material composition of the lower interfacial film 200. The lower interfacial film 200 may be a main cause for a capacitance change with respect to bias voltage. The composition ratio may vary with detailed selection of M and M'.

As a source of a metal material in an atomic layer deposition (ALD) process generally used to fabricate a metal nitride, a metal organic ligand material may be used as a precursor. In this case, when the organic ligand is not removed well after the metal material is applied to a target surface, carbon impurities may be included in the metal nitride, degrading the performance of the capacitor 1. The capacitor 1 according to an embodiment may use the metal nitride, MM'N, as a material of the lower electrode 100 as described above, and according to a fabricating method to be described below, the metal nitride, MM'N, having few carbon impurities may be used in the lower electrode 100. A carbon content of the lower electrode 100 may be less than or equal to 1%.

The lower interfacial film 200 may be provided on the lower electrode 100. The lower interfacial film 200 may include at least one of a metal oxide including a metal element included in the lower electrode 100. For example, when the lower electrode 100 includes the metal nitride expressed as MM'N, the lower interfacial film 200 may include a metal nitroxide expressed as MM'ON. Alternatively, the lower interfacial film 200 may include a material expressed as M'O or M'ON. Herein, M is a metal element included in the lower electrode 100, M' is an element other than M, which is included in the lower electrode 100, N is nitrogen, and O is oxygen. Example materials of M and M' may be substantially the same as described above. The lower interfacial film 200 may include, for example, NbO or NbON. A thickness of the lower interfacial film 200 may be less than that of the lower electrode 110. A carbon impurity content of the lower interfacial film 200 may be less than or equal to 1%.

The dielectric film 300 may be provided on the lower interfacial film 200. The dielectric film 300 may directly contact the lower interfacial layer 200. The dielectric film 300 may have a material selected based on a desired capacitance. As the degree of integration of an integrated circuit device included in the capacitor 1 increases, a space available for by the capacitor 1 gradually decreases and thus, in order to reduce the size of the capacitor 1, a high-permittivity dielectric may be beneficial.

The dielectric film 300 may include a high-permittivity material. The high permittivity may mean a permittivity higher than that of a silicon oxide. The dielectric film 300 may use a metal oxide including at least one metal selected from among Ca, Sr, Ba, Sc, Y, La, Ti, Hf, Zr, Nb, Ta, Ce, Pr, Nd, Gd, Dy, Yb, Lu, and/or the like. For example, the dielectric film 300 may include at least one of $HfO_2$, $ZrO_2$, $CeO_2$, $La_2O_3$, $Ta_2O_3$, $TiO_2$, and/or the like. The dielectric film 300 may have a single-layer structure as shown, and/or may also have a multi-layer structure. For example, the dielectric film 300 may have a multi-layer structure of $ZrO_2/HfO_2/ZrO_2/HfO_2$ and/or a multi-layer structure of $(HfO_2+ZrO_2)/AlO_3/ZrO_2/AlO_3$.

The leakage current reduction film 400 may be provided on the dielectric film 300. The leakage current reduction film 400 may prevent leakage current from flowing between and/or reduce the leakage current between the upper electrode 500 and the lower electrode 100. The leakage current reduction film 400 may be a doped AlZrO (also referred to as AZO) film. The doped AlZrO may be represented by $(L_1)nAl_xZr_yO_{(0.5n+1.5x+2y)}$, $(L_2)_mAl_xZr_yO_{(m+1.5x+2y)}$ or $(L_1)n(L_2)_mAl_xZr_yO_{(0.5n+m+1.5x+2y)}$, wherein $L_1$ is one of K, Rb, Cs, and Fr, $L_2$ is one of Sr, Ba, and Ra, wherein x, y, n and m respectively represent an atomic percentage of the metal atoms in the doped AlZrO, and wherein $0<(n+x)\leq 0.25$, $0<(m+x)\leq 0.25$, $0<(n+m+x)\leq 0.25$ and $0.75\leq y<1$. For example, Zr of about 75 at % or more may be contained in metal atoms except for O in the leakage current reduction film 400.

The dopant may be selected not to excessively increase a crystallinity index of the leakage current reduction film 400 such that the leakage current reduction film 400 has a high degree of crystallinity. The dopant may include an element having an ionic radius of 130 or more. For example, the dopant (the ionic radius thereof) may be at least one selected from among K (152 pm), Rb (166 pm), Cs (181 pm), Sr (132 pm), Ba (149 pm), Nd (143 pm), Sm (136 pm), Eu (131 pm), Fr (194 pm), and/or Ra (162 pm). A capacitance difference with respect to the ionic radius of the dopant will be described later. In an example, the dopant may be strontium (Sr), and the doped AlZrO film may be an $Sr_mAl_xZr_yO_{(m+1.5x+2y)}$ film. Ranges of m, x, and y may be $0<m+x\leq 0.25$, and $0.75\leq y<1.00$. For example, a total content of Al and Sr in the metal atoms except for O in the leakage current reduction film 400 may be less than or equal to about 25 at %. When a total content of Al and Sr in the metal atoms except for O in the leakage current reduction film 400 exceeds about 25 at %, the dielectric film 300 may be difficult to crystallize. Therefore, the capacitor 1 may have a lower capacitance than a capacitance thereof in the absence of the leakage current reduction film 400. The doped AlZrO film may have leakage current reduction characteristics, similar to those of an undoped AlZrO film, while improving capacitance characteristics of the capacitor 1. The improvement of the capacitance characteristics based on the doped AlZrO film will be described later.

A total thickness of the dielectric film 300 and the leakage current reduction film 400 may be determined to facilitate crystallization of the dielectric film 300 and the leakage current reduction film 400 and to allow the capacitor 1 to have a sufficient capacitance. For example, the total thickness of the dielectric film 300 and the leakage current reduction film 400 may be about 20 angstroms (Å) to about 80 Å. When the total thickness of the dielectric film 300 and the leakage current reduction film 400 is less than about 20 Å, the dielectric film 300 and the leakage current reduction film 400 may be difficult to crystallize. When a total thickness of the dielectric film 300 and the leakage current reduction film 400 is greater than about 80 Å, a capacitance the capacitor 1 may be reduced. A thickness of the dielectric film 300 may be about one and a half (1.5) times that of the leakage current reduction film 400.

The upper electrode 500 may be provided on the leakage current reduction film 400. The upper electrode 500 may include at least one of a metal, a conductive metal nitride, a conductive metal oxide, a combination thereof, and/or the like. For example, the upper electrode 500 may include at least one of TiN, MoN, CoN, TaN, TiAlN, TaAlN, W, Ru, $RuO_2$, $SrRuO_3$, Ir, $IrO_2$, Pt, PtO, SRO($SrRuO_3$), BSRO(($Ba,Sr$)$RuO_3$), CRO($CaRuO_3$), LSCO(($La,Sr$)$CoO_3$), a combination thereof, and/or the like.

The improvement of the capacitance characteristics based on the doped AlZrO film will be described below.

Figure 2:
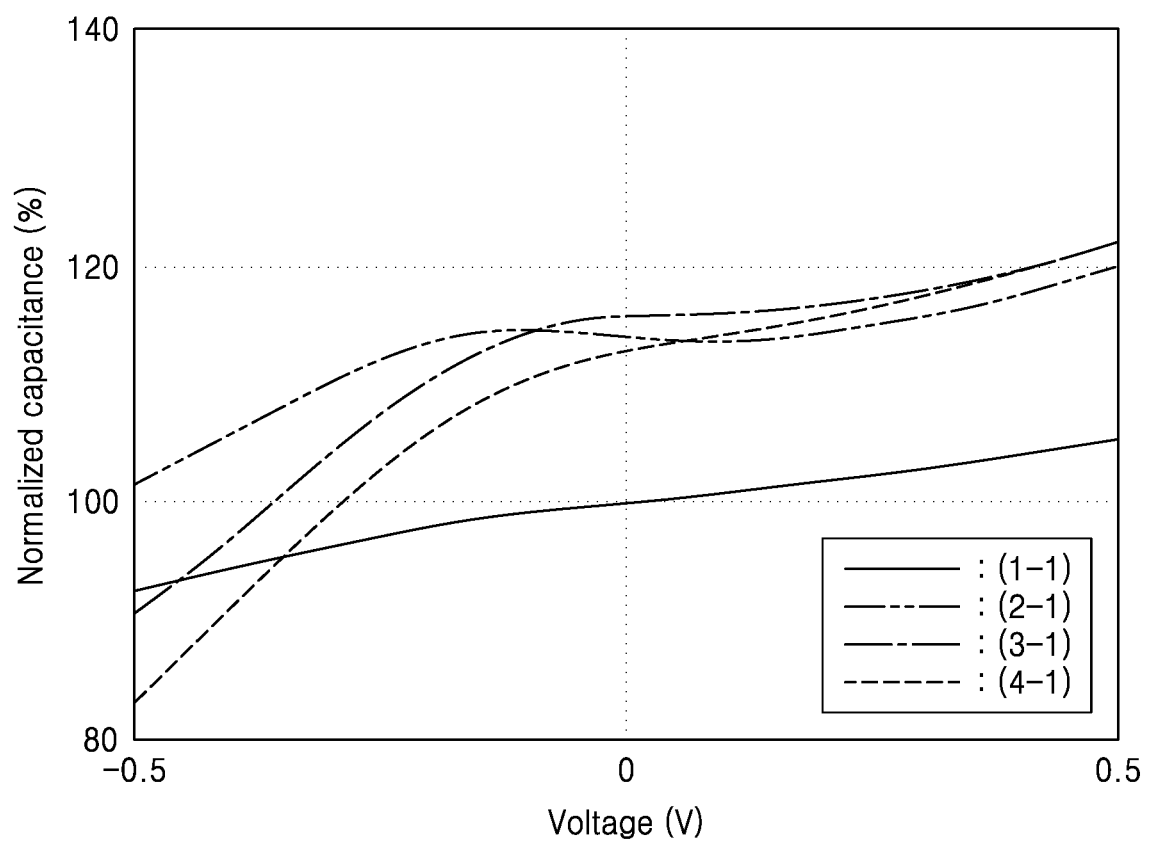
FIG. 2 shows normalized capacitance with respect to bias voltage.
Figure 3:
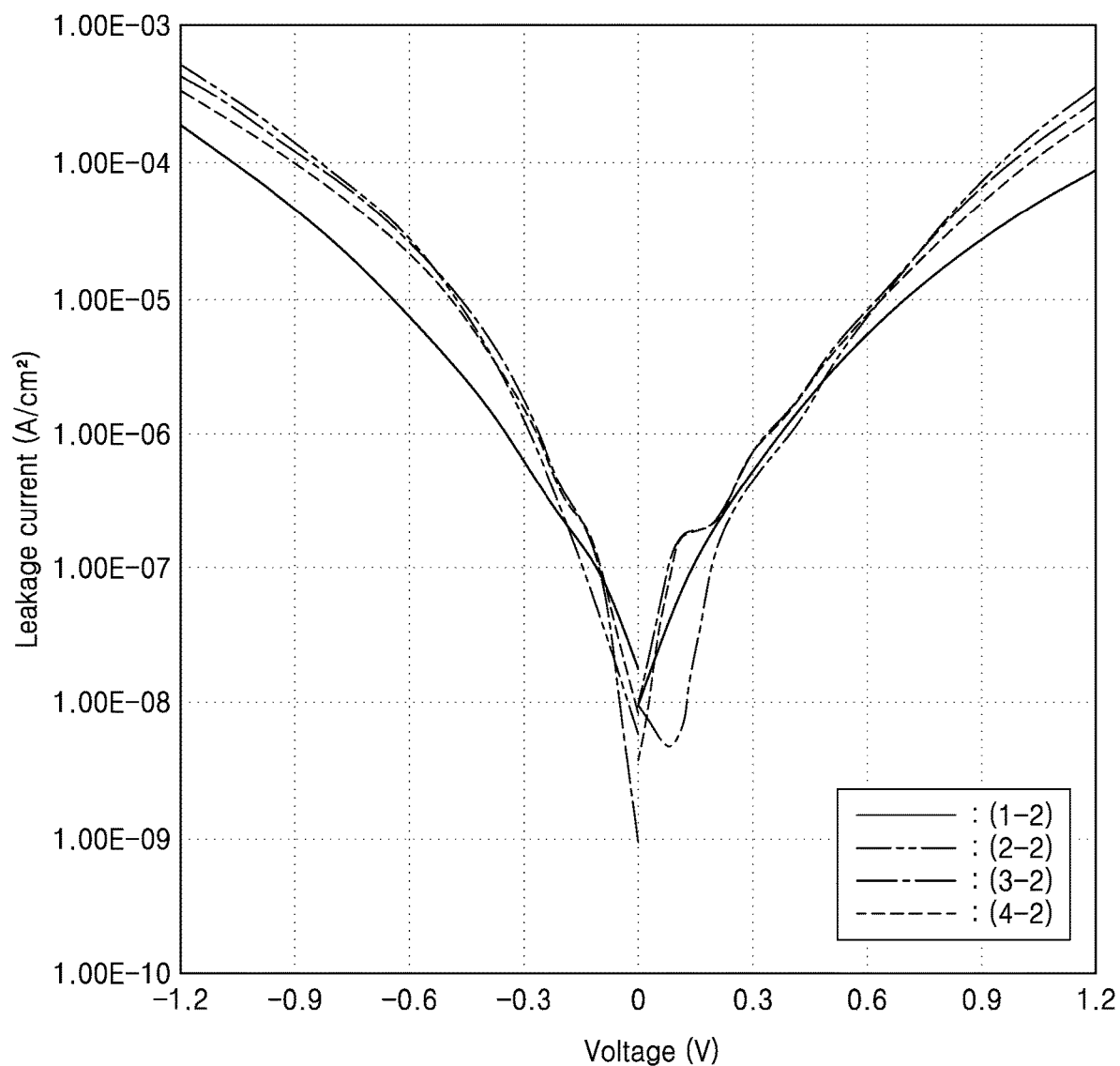
FIG. 3 shows leakage current with respect to bias voltage.
Figure 4:
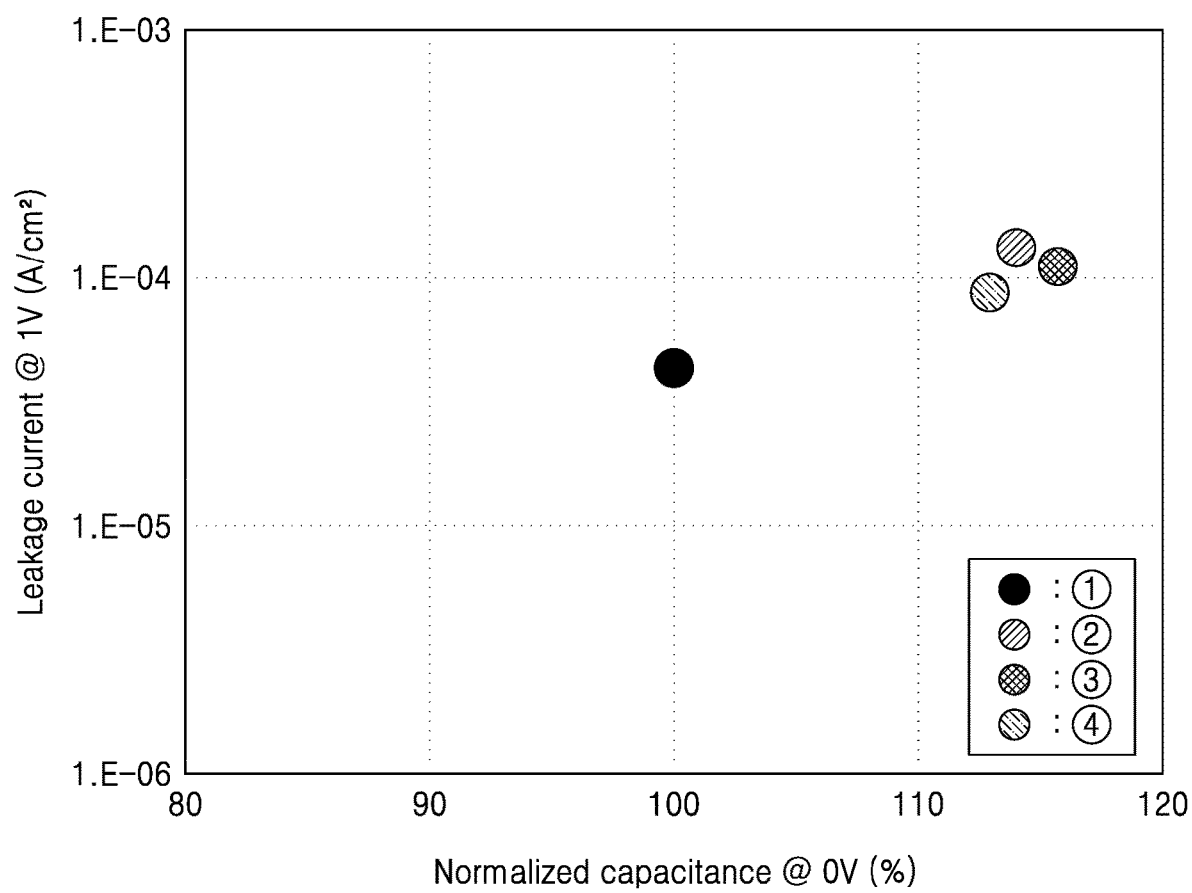
FIG. 4 shows leakage current with respect to normalized capacitance.

FIG. 2 shows normalized capacitance with respect to bias voltage. FIG. 3 shows leakage current with respect to bias voltage. FIG. 4 shows leakage current with respect to normalized capacitance.

Referring to FIG. 2, graphs 1-1, 2-1, 3-1, and 4-1 of normalized capacitances with respect to bias voltages per content of Sr and Al in the leakage current reduction film 400 are provided. Referring to FIG. 3, graphs 1-2, 2-2, 3-2, and 4-2 of leakage currents with respect to bias voltages per content of Sr and Al in the leakage current reduction film 400 are provided. Referring to FIG. 4, dots ①, ②, ③, and ④ indicating leakage currents with respect to normalized capacitances per content of Sr and Al in the leakage current reduction film 400 are provided. A bias voltage may be a difference between a voltage applied to the upper electrode 500 and a voltage applied to the lower electrode 100. When the bias voltage is positive, the voltage applied to the upper electrode 500 may be greater than the voltage applied to the lower electrode 100, and when the bias voltage is negative, the voltage applied to the lower electrode 100 may be greater than the voltage applied to the upper electrode 500. The leakage currents of FIG. 4 are measured at a bias voltage of 1 volt (V).

The graph 1-1, the graph 1-2, and the dot ① indicate that the leakage current reduction film 400 is an undoped AlZrO film that contains about 20 at % of Al. The graph 2-1, the graph 2-2, and the dot ② indicate that the leakage current reduction film 400 is an AlZrO film doped with Sr, which contains about 5 at % of Sr and about 15 at % of Al. The graph 3-1, the graph 3-2, and the dot ③ indicate that the leakage current reduction film 400 is an AlZrO film doped with Sr, which contains about 10 at % of Sr and about 15 at % of Al. The graph 4-1, the graph 4-2, and the dot ④ indicate that the leakage current reduction film 400 is an AlZrO film doped with Sr, which contains about 15 at % of Sr and about 15 at % of Al. Here, a lower electrode includes TiN with 10 nm thickness, an upper electrodes include TiN with 10 nm thickness, and a dielectric film includes $ZrO_2$.

As shown in FIG. 2, the graph 2-1, the graph 3-1, and the graph 4-1 may be greater than the graph 1-1 in the most area of the bias voltage. When the bias voltage is close to about −0.5 V, the graph 2-1 has a capacitance higher than that of the graph 1-1, the graph 3-1 has a capacitance similar to that of the graph 1-1, and the graph 4-1 has a capacitance much lower than that of the graph 1-1. As shown in FIG. 3, the graph 2-2, the graph 3-2, and the graph 4-2 are similar to the graph 1-2. As shown in FIG. 4, the dot ②, the dot ③, and the dot ④ have leakage currents similar to that of the dot ① and have normalized capacitances higher than that of the dot ①.

For example, when the leakage current reduction film 400 is an Sr-doped AlZrO film containing about 5 at % of Sr and about 15 at % of Al and when the leakage current reduction film 400 is an Sr-doped AlZrO film containing about 10 at % of Sr and about 15 at % of Al, the leakage current reduction film 400 has leakage current characteristics that are similar to or better than those when an undoped AlZrO film is used as the leakage current reduction film 400 and has capacitance characteristics improved as compared to those of the undoped AlZrO film. When the leakage current reduction film 400 is an Sr-doped AlZrO film containing about 15 at % of Sr and about 15 at % of Al, the leakage current reduction film 400 has leakage current characteristics that are similar to those of the undoped AlZrO film used as the leakage current reduction film 400, but has lower capacitance characteristics than those of the undoped AlZrO film near a partial bias voltage area (e.g., near about −0.5 V). Therefore, a rate of Al and Zr in the leakage current reduction film 400 may be determined to be less than or equal to about 25 at %.

Figure 5:
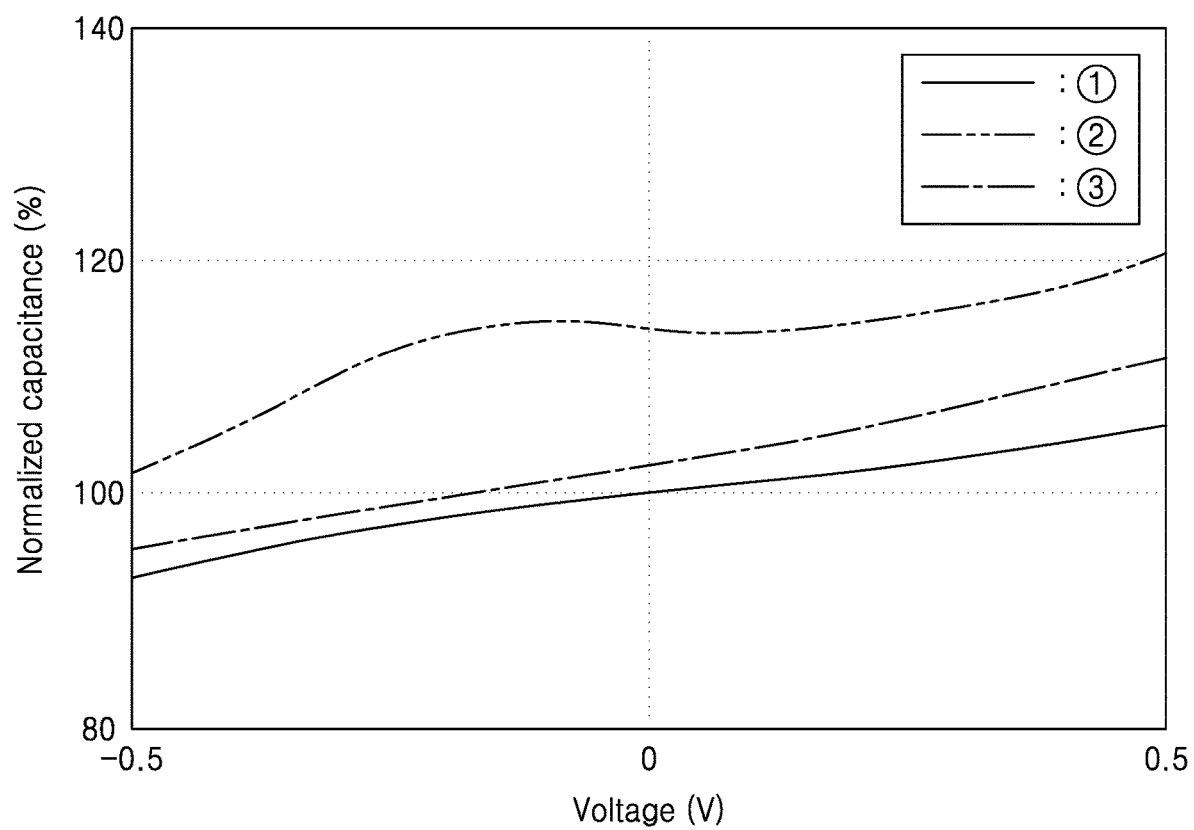
FIG. 5 shows a normalized capacitance difference with respect to an ionic radius of a dopant doped in a leakage current reduction film.

FIG. 5 shows a normalized capacitance difference with respect to an ionic radius of a dopant doped in a leakage current reduction film.

Referring to FIG. 5, a graph ① indicating that the leakage current reduction film 400 is an undoped AlZrO film, a graph ② indicating that the leakage current reduction film 400 is an Sr-dope AlZrO film containing about 5 at % of Sr and about 15 at % of Al, and a graph ③ indicating that the leakage current reduction film 400 is a lanthanum (La)-doped AlZrO film containing about 5 at % of La and about 15 at % of Al are provided. An ionic radius of La, which is about 117 pm, may be less than an ionic radius of Sr, which is about 132 pm.

A capacitance (the graph ③) when the leakage current reduction film 400 is an La-doped AlZrO film containing about 5 at % of La and about 15 at % of Al is less than a capacitance (the graph ②) when the leakage current reduction film 400 is an Sr-doped AlZrO film containing about 5 at % of Sr and about 15 at % of Al, and is similar to a capacitance (the graph ①) when the leakage current reduction film 400 is the undoped AlZrO film.

When a dopant having an ionic radius less than that of Sr is doped in the leakage current reduction film 400, the leakage current reduction film 400 may have a high crystallinity index and a low crystallization degree. Therefore, the dielectric film 300 may have a low crystallization degree and the capacitor 1 may have a low capacitance.

Unlike in the present disclosure, when the undoped AlZrO film is provided between the upper electrode 500 and the dielectric film 300, leakage current may be reduced, but the dielectric film 300 may have a low crystallization degree due to the low crystallization degree of the undoped AlZrO film. Therefore, the capacitor 1 may have a lower capacitance than a capacitance thereof in the absence of the undoped AlZrO film.

The leakage current reduction film 400 according to the present disclosure has a high crystallization degree while having leakage current blocking characteristics similar to those of the doped AlZrO film. That is, the present disclosure may improve capacitance characteristics as compared to the use of the doped AlZrO film.

When the leakage current reduction film 400 is provided between the dielectric film 300 and the lower interfacial film 200, the dopant (e.g., Sr) in the leakage current reduction film 400 may p-dope the lower interfacial film 200 (e.g., $TiO_2$). When the voltage applied to the lower electrode 100 is higher than that applied to the upper electrode 500, a depletion region in the p-doped lower interfacial film 200 may be widened, thus lowering the crystallization degree of the dielectric film 300. As a result, the capacitance of the capacitor 1 may be reduced.

The leakage current reduction film 400 according to the present disclosure may be provided between the dielectric film 300 and the upper electrode 500, such that the lower interfacial film 200 may not be p-doped. Therefore, the crystallization degree of the dielectric film 300 and the capacitance of the capacitor 1 may not be reduced.

Figure 6:
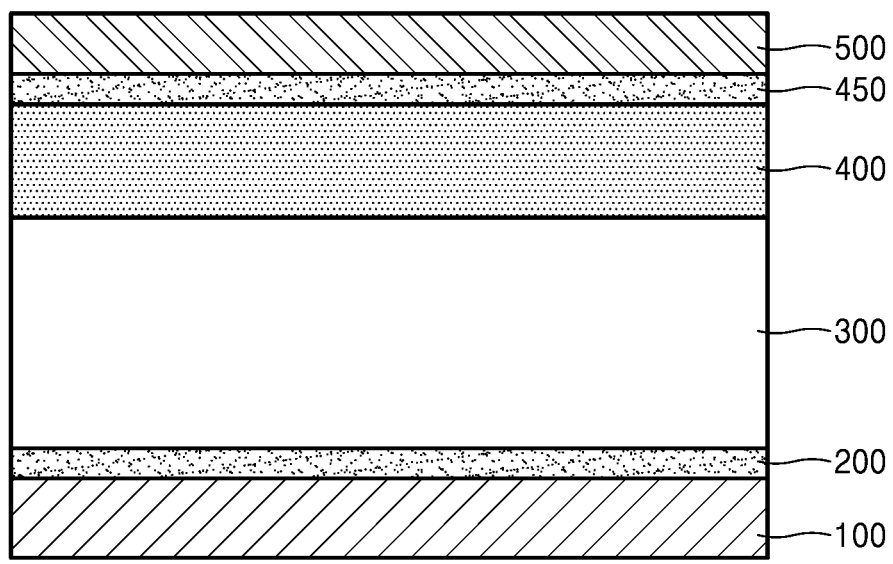
FIGS. 6-8 are cross-sectional views of a capacitor according to some example embodiments.

FIG. 6 shows an example in which an upper interfacial film is further included in the capacitor shown in FIG. 1. In FIG. 6 components using the same reference numerals as in FIG. 1 have substantially the same configurations and functions, and thus will not be described in detail herein.

A capacitor 1A may further include an upper interfacial film 450 between the leakage current reduction film 400 and the upper electrode 500.

The upper interfacial film 450 may include a metal oxide and/or a metal oxynitride. The upper interfacial film 450 may include a material represented by M"O and/or M"ON. M" may include at least one of H, Li, Be, B, N, O, Na, Mg, Al, Si, P, S, K, Ca, Sc, Ti, V, Cr, Mn, Fe, Co, Ni, Cu, Zn, Ga, Ge, As, Se, Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, U, and/or the like. In at least one embodiment, M" and M' may be the same material, such that the upper interfacial film 450 may also be represented by M'O and/or M'ON.

For example, the lower electrode 100 may include TiN, the lower interfacial film 200 may include NbO or NbON, the dielectric film 300 may include a multi-layer of $ZrO_2$/$HfO_2$/$HfO_2$ or a multi-layer of $(HfO_2+ZrO_2)$/$AlO_3$/$ZrO_2$/$AlO_3$, the upper interfacial film 450 may include TiON or NbO, and the upper electrode 500 may include TiN.

Figure 7:
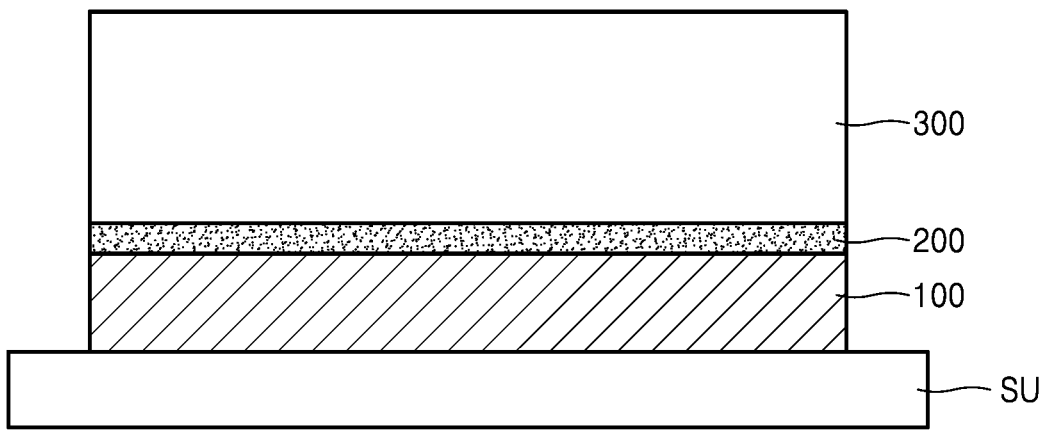
Figure 8:
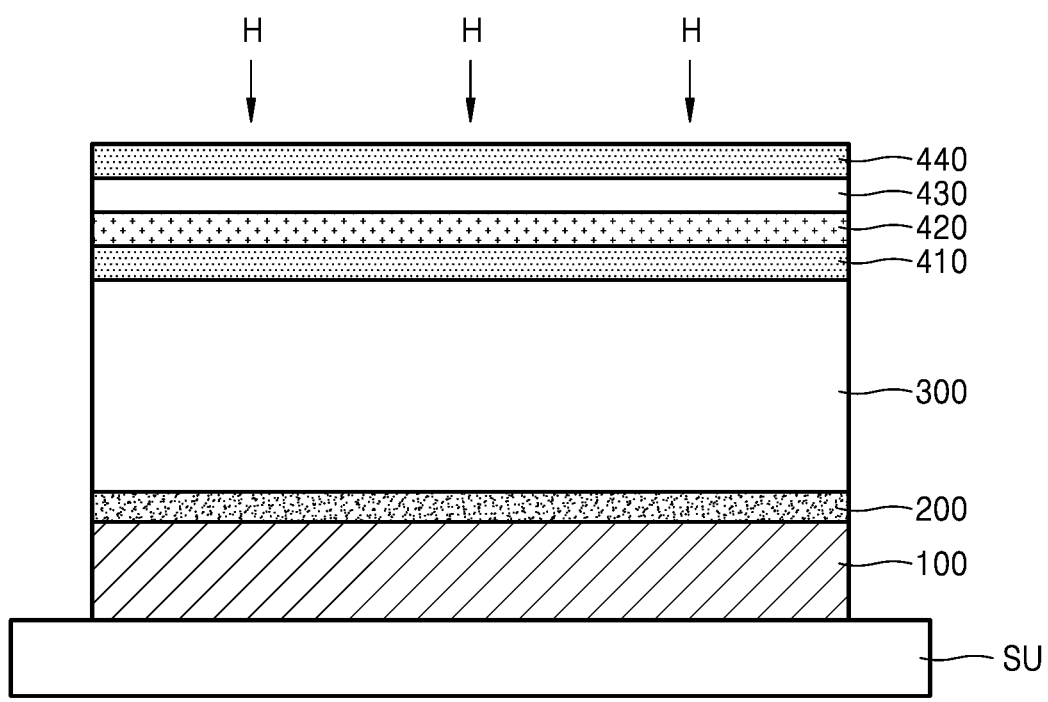

FIGS. 7 and 8 are cross-sectional views schematically illustrating a method of fabricating the capacitor of FIG. 1.

Referring to FIG. 7, the lower electrode 100, the lower interfacial film 200, and the dielectric film 300 may be sequentially formed on a substrate SU. The substrate SU may include at least one a semiconductor material pattern, an insulating material pattern, and/or a conductive material pattern. For example, the substrate SU may include the substrate 1100, a gate structure 1300, an interlayer insulating film 1400, and a contact 1500 of FIG. 11 which will be described later.

The lower electrode 100 may be formed on the substrate SU by deposition. For example, a process of forming the lower electrode 100 may include a chemical vapor deposition (CVD) process, a physical vapor deposition (PVD) process, or an ALD process. The lower electrode 100 may include at least one of metal, a conductive metal nitride, a conductive metal oxide, a combination thereof, and/or the like. For example, the lower electrode 100 may include at least one of TiN, MoN, CoN, TaN, W, Ru, $RuO_2$, Ir, $IrO_2$, Pt, PtO, SRO($SrRuO_3$), BSRO(($Ba,Sr$)$RuO_3$), CRO($CaRuO_3$), LSCO(($La,Sr$)$CoO_3$), or a combination thereof. A method of fabricating the lower electrode 100 when the lower electrode 100 includes a metal nitride expressed as MM'N will be described in detail later.

The lower interfacial film 200 may be a natural oxide film formed on the lower electrode 100. The lower interfacial film 200 may include a metal oxide including a metal element included in the lower electrode 100. For example, when the lower electrode 100 includes the metal nitride expressed as MM'N, the lower interfacial film 200 may include a metal nitroxide expressed as MM'ON. Alternatively, the lower interfacial film 200 may include a material expressed as M'O or M'ON. Example materials of M and M' may be substantially the same as described above. A thickness of the lower interfacial film 200 may be less than that of the lower electrode 100. A carbon impurity content of the lower interfacial film 200 may be less than or equal to 1%. In some example embodiments, the lower interfacial film 200 may be formed, for example, by introducing an oxygen source after the deposition of the MM'N and/or once the lower electrode has reached a set (or otherwise desired) thickness The dielectric film 300 may be deposited on the lower interfacial film 200. For example, the dielectric film 300 may be formed by, e.g., at least one of a CVD process, a PVD process, and/or an ALD process. The dielectric film 300 may include a high-permittivity material. For example, the dielectric film 300 may use a metal oxide including at least one metal selected from among Ca, Sr, Ba, Sc, Y, La, Ti, Hf, Zr, Nb, Ta, Ce, Pr, Nd, Gd, Dy, Yb, and/or Lu. For example, the dielectric film 300 may include $HfO_2$, $ZrO_2$, $CeO_2$, $La_2O_3$, $Ta_2O_3$, $TiO_2$, and/or the like. For brevity of a description, the dielectric film 300 including $ZrO_2$ will be described.

Referring to FIG. 8, a lower $Al_2O_3$ film 410, a dopant film 420, a $ZrO_2$ film 430, and an upper $Al_2O_3$ film 440 may be sequentially formed on the dielectric film 300. The dopant film 420 may include an oxide of an element having an ionic radius of 130 μm or more. For example, the dopant film 420 may be an oxide film of at least one of K, Rb, Cs, Sr, Ba, Nd, Sm, Eu, Fr, and/or Ra. The lower $Al_2O_3$ film 410, the dopant film 420, the $ZrO_2$ film 430, and the upper $Al_2O_3$ film 440 may be formed by, e.g., a CVD process, a PVD process, and/or an ALD process. A thickness of the lower $Al_2O_3$ film 410 may be, for example, about 1 to about 3 angstroms (Å). A thickness of the dopant film 420 may be, for example, about 1 to about 2 Å. A thickness of the $ZrO_2$ film 430 may be, for example, about 20 to about 100 Å. A thickness of the upper $Al_2O_3$ film 440 may be, for example, about 1 to about 3 Å.

During or after a process of forming the lower $Al_2O_3$ film 410, the dopant film 420, the $ZrO_2$ film 430, and the upper $Al_2O_3$ film 440, a heat-treatment process H may be performed. The lower $Al_2O_3$ film 410, the dopant film 420, the $ZrO_2$ film 430, and the upper $Al_2O_3$ film 440 may be mixed by the heat-treatment process H to form an Sr-doped AlZrO film, and the leakage current reduction film 400 described with reference to FIG. 1 may be formed. A process of forming the leakage current reduction film 400 is not limited to the foregoing disclosure. In another example, the leakage current reduction film 400 may be formed by depositing Al, Zr, O, and Sr in an in-situ state through an ALD process.

Referring back to FIG. 1, the upper electrode 500 may be formed on the leakage current reduction film 400. The upper electrode 500 may be formed by a deposition process. For example, the upper electrode 500 may be formed by a CVD process, a PVD process, or an ALD process. The upper electrode 500 may include at least one of metal, a conductive metal nitride, a conductive metal oxide, a combination thereof, and/or the like. For example, the upper electrode 500 may include TiN, MoN, CoN, TaN, W, Ru, $RuO_2$, Ir, $IrO_2$, Pt, PtO, SRO(SrRuO_3$), BSRO((Ba,Sr)RuO_3$), CRO (CaRuO_3$), LSCO((La,Sr)CoO_3$), a combination thereof, and/or the like.

Hereinbelow, a method of fabricating a lower electrode including a metal nitride expressed as MM'N will be described.

Figure 9:
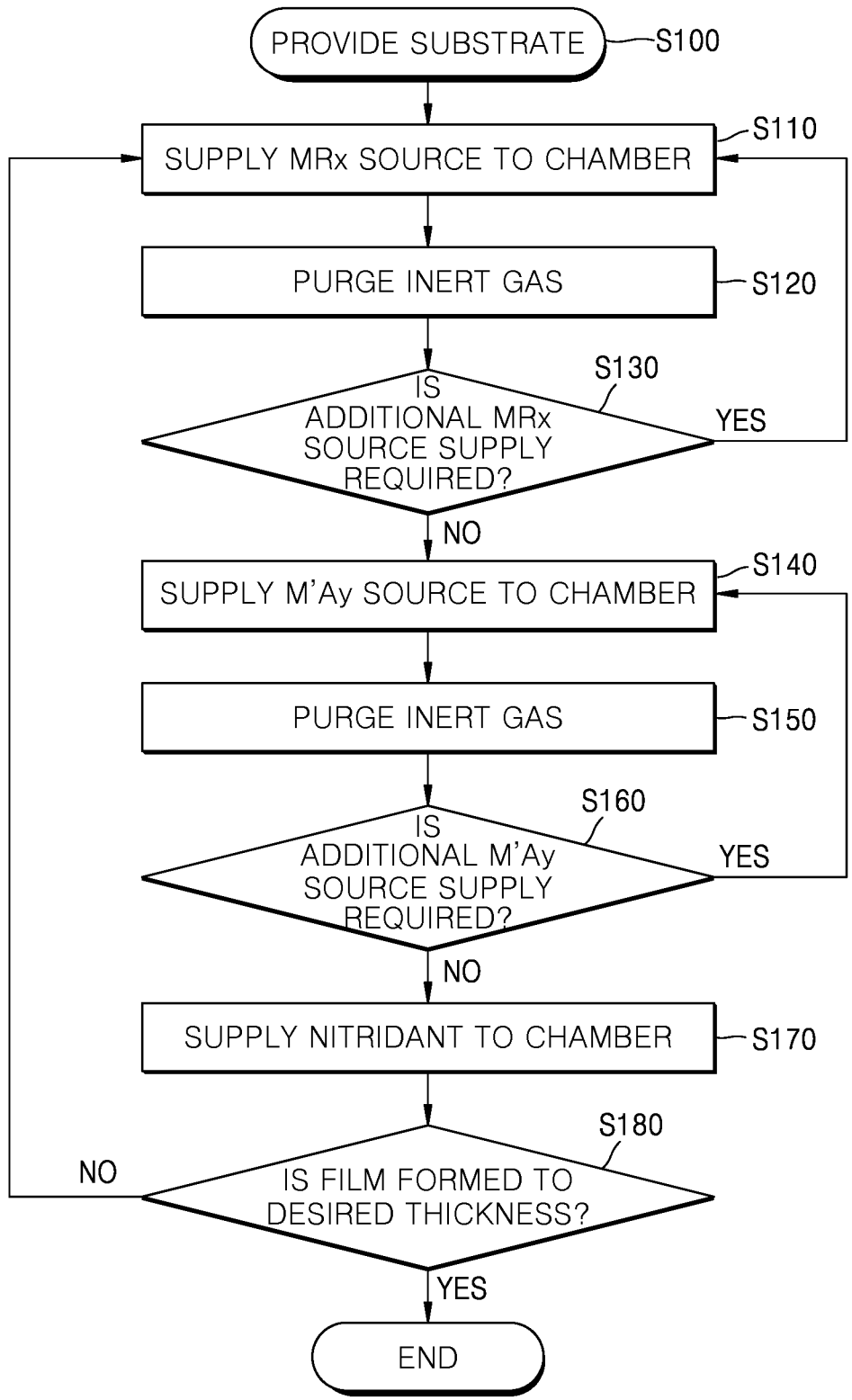
FIG. 9 is a flowchart of a method of fabricating a lower electrode including a metal nitride expressed as MM'N.

FIG. 9 is a flowchart of a method of fabricating a lower electrode including a metal nitride expressed as MM'N. FIGS. 10A-10H are conceptual diagrams illustrating a method of fabricating the lower electrode of FIG. 9.

Figure 10A:
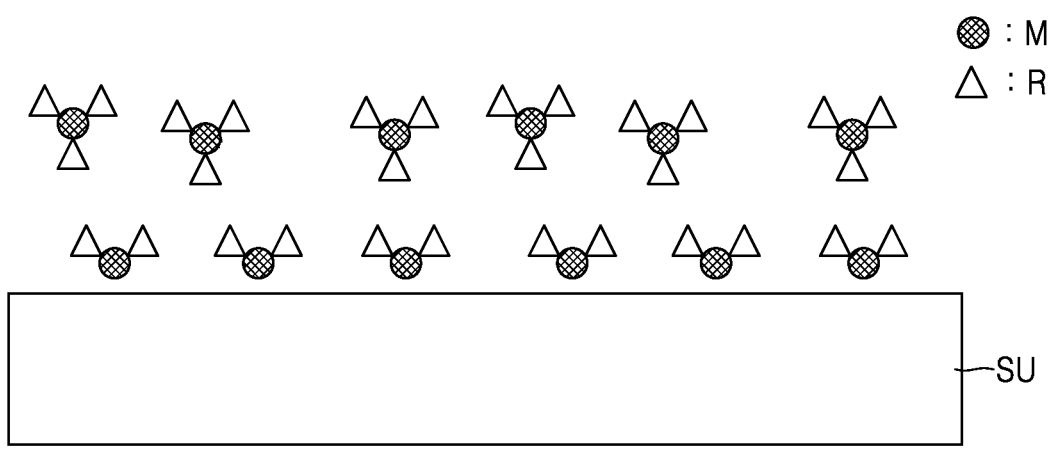
FIGS. 10A-H are conceptual diagrams illustrating a method of fabricating a lower electrode of FIG. 9.
Figure 10B:
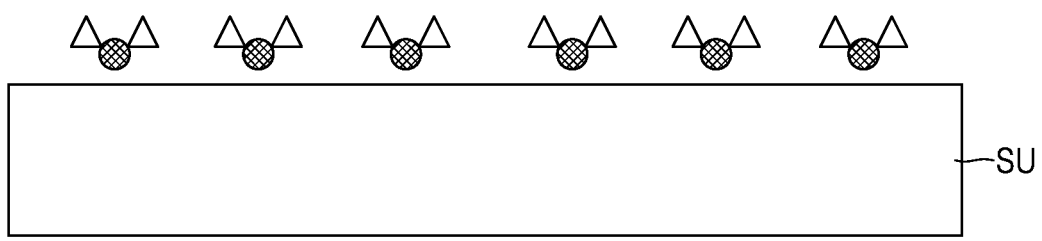

Referring to FIGS. 9, 10A, and 10B, the substrate SU may be provided in operation S100. The substrate SU may include a target surface on which a lower electrode is to be formed. The substrate SU may include a semiconductor material pattern, an insulating material pattern, or a conductive material pattern. For example, the substrate SU may include the substrate 1100, the gate structure 1300, the interlayer insulating film 1400, and a contact 1500 of FIG. 11.

After the substrate SU is arranged in a reaction chamber, a first source including a metal organic ligand may be supplied to the reaction chamber in operation S110. The metal organic ligand may be expressed as MRx including a metal element M and an organic ligand R. x may be 0<x≤6. M may be at least one of Be, B, Na, Mg, Al, Si, K, Ca, Sc, Ti, V, Cr, Mn, Fe, Co, Ni, Cu, Zn, Ga, Ge, Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, and/or U. R may be at least at least one of a C1-C10 alkyl group, a C2-C10 alkenyl group, a carbonyl group (C═O), halide, a C6-C10 aryl group, a C6-C10 cycloalkyl group, a C6-C10 cycloalkenyl group, (C═O)R (R is hydrogen or the C1-C10 alkyl group), a C1-C10 alkoxy group, a C1-C10 amidinate, C1-C10 alkylamides, C1-C10 alkylimides, —N(Q)(Q') (Q and Q' are independently of each other the C1-C10 alkyl group or hydrogen), Q(C═O)CN (Q is hydrogen or the C1-C10 alkyl group), C1-C10 O-diketonates, and/or the like.

As a process of supplying the first source, the ALD process may be used. The ALD process may be performed at a temperature of about 100° C. to about 500° C. A process temperature may be set according to thermal stability of the metal organic ligand. A metal organic ligand having low thermal stability may be decomposed at high temperatures, such that the ALD process with respect to the metal organic ligand having low thermal stability may be performed at a temperature of about 400° C. or less.

The organic ligand not adsorbed on the substrate SU out of the metal organic ligand provided in the reaction chamber may be removed by purging in operation S120. The purging may be a process of discharging an organic ligand not participating in the reaction or an organic ligand that is a by-product after participating in the reaction to the outside of the reaction chamber. For the purging, an inert gas, such as Ar, He, Ne, etc., or an $N_2$ gas may be used.

As shown in FIG. 10B, the metal organic ligand may be adsorbed on the substrate SU.

The process of FIGS. 10A and 10B may be represented by the following chemical equations (1) and (2).

$$xMR_4 \rightarrow xMR_{4-a} + x^*aR \qquad (1)$$

$$xMR_{4-a} + x^*aR \rightarrow xMR_{4-a} \qquad (2)$$

Equation (2) indicates that the remaining ligand component is removed by purging.

Next, it may be determined by a control device (not shown) whether an additional $MR_x$ source supply is required, in operation S130, and when necessary, operations S110 and S120 may repeated.

Referring to FIGS. 9, 10C, 10D, and 10E, a second source including a halogen compound may be supplied to the reaction chamber in operation S140. As a process of supplying the second source, the ALD process may be used. The ALD process may be performed at a temperature of about 100° C. to about 500° C. The process temperature may be set based on the thermal stability of the metal organic ligand adsorbed on the substrate SU. The metal organic ligand having low thermal stability may be decomposed at high temperatures, such that the ALD process with respect to the halogen compound may be performed at a temperature of about 400° C. or less.

The halogen compound may be expressed as M'Ay (y is a real number greater than 0) including a halogen element A. A may include, for example, at least one of F, Cl, Br, and/or I. y may be 0<y≤6. M' may be at least one of H, Li, Be, B, N, O, Na, Mg, Al, Si, P, S, K, Ca, Sc, Ti, V, Cr, Mn, Fe, Co, Ni, Cu, Zn, Ga, Ge, As, Se, Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, and/or U. The halogen compound may be adsorbed onto the substrate SU and may displace at least a portion of the organic ligand.

Next, the organic ligand that does not react with the halogen compound may be removed by purging in operation S150. For the purging, an inert gas, such as Ar, He, Ne, etc., or an $N_2$ gas, may be used. In this operation, the halogen compound that does not participate in the reaction and the reaction by-product may be removed, together.

Figure 10C:
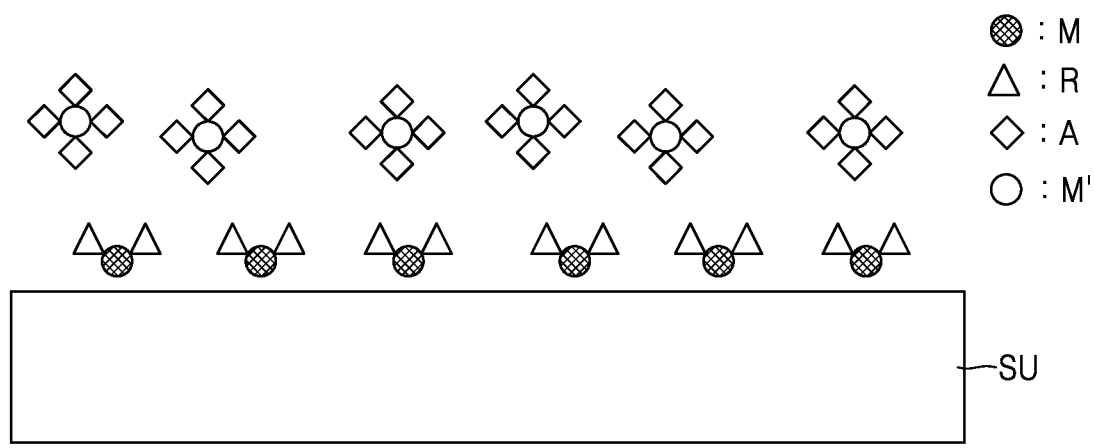
Figure 10D:
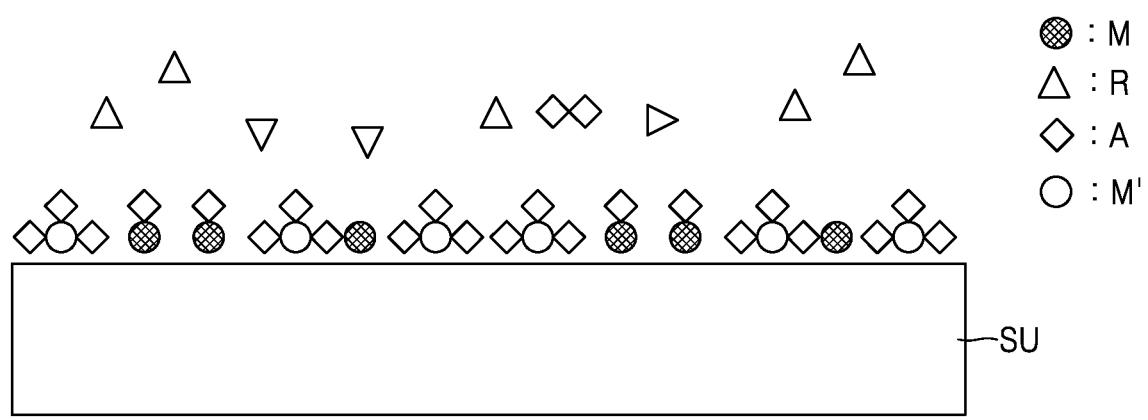
Figure 10E:
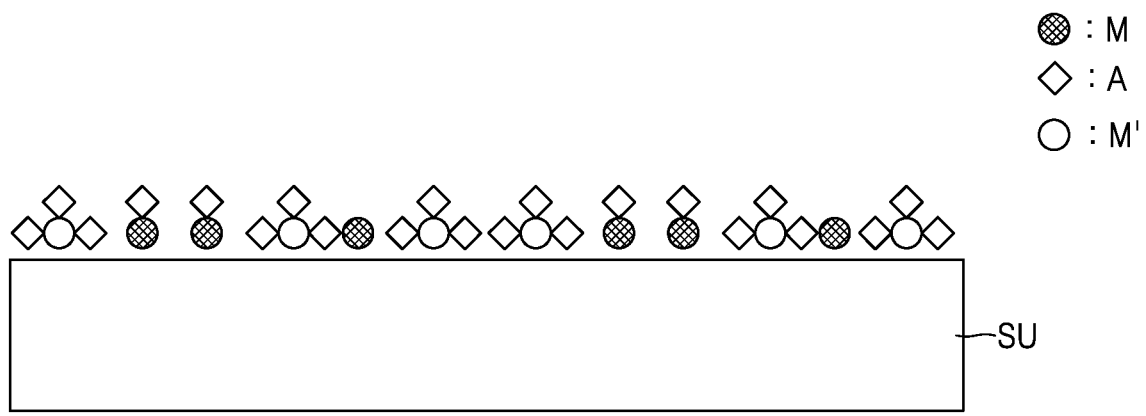

Operation S140 of supplying the second source including the halogen compound and operation S150 of performing purging are shown in FIGS. 10C to 10E and may be expressed as chemical Equations (3) to (5).

$$yM'Cl_4 \rightarrow yM'Cl_{4-b} + y*bCl \quad (3)$$

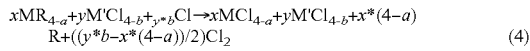

$$xMR_{4-a} + yM'Cl_{4-b} + y*_bCl \rightarrow xMCl_{4-a} + yM'Cl_{4-b} + x*(4-a)R + ((y*b - x*(4-a))/2)Cl_2 \quad (4)$$

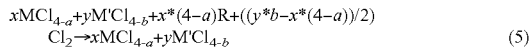

$$xMCl_{4-a} + yM'Cl_{4-b} + x*(4-a)R + ((y*b - x*(4-a))/2)Cl_2 \rightarrow xMCl_{4-a} + yM'Cl_{4-b} \quad (5)$$

In the foregoing equation, for brevity, Cl is provided as an example of the halogen element A, and Equation (5) indicates that the remaining ligand component and the by-product are removed by purging.

As shown in FIG. 10E, M supplied by the first source and M' supplied by the second source are adsorbed on the substrate SU in a state of being coupled to the halogen element A.

Next, it is determined in operation S160 whether an additional M'Ay source supply is necessary, and when necessary, operations S140 and S150 may be repeated.

Referring to FIGS. 9, 10F, 10G, and 10H, a nitridant may be supplied to the reaction chamber in operation S170. As a process of supplying the nitridant, the ALD process may be used and performed at a temperature of about 100° C. to about 500° C. The nitridant, which is a reaction gas including a nitrogen element, may include at least one of $NH_3$, $N_2H_2$, $N_3H$, or $N_2H_4$. The nitridant may react with M coupled to the halogen element A and M' coupled to the halogen element A, and a metal nitride film MM'N may be formed on the substrate SU. The reaction by-product including the halogen element may be mostly vaporized by the process temperature.

Figure 10F:
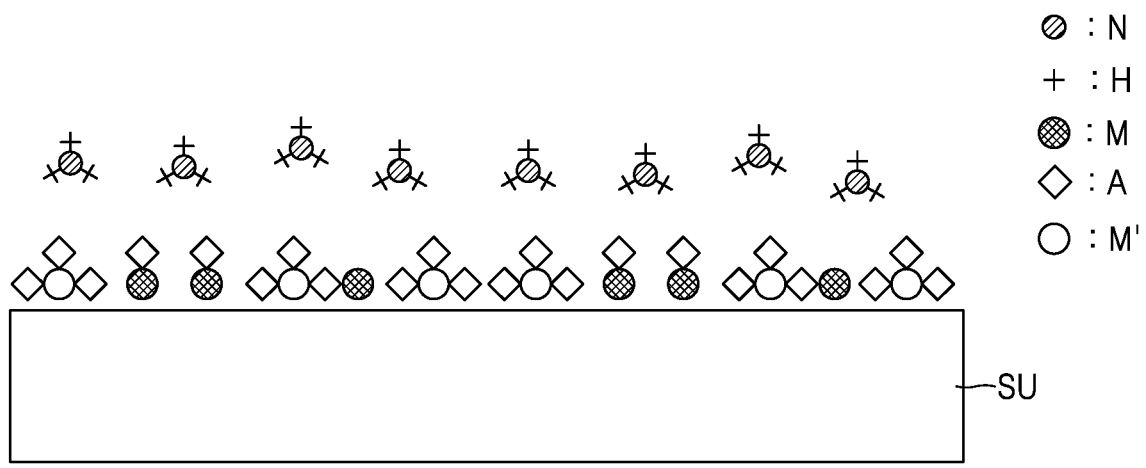
Figure 10G:
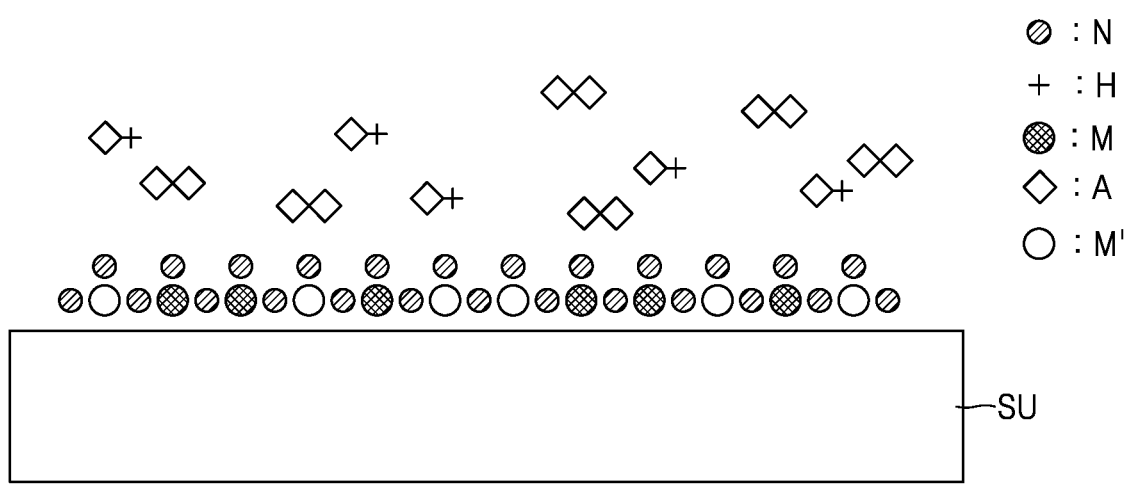
Figure 10H:
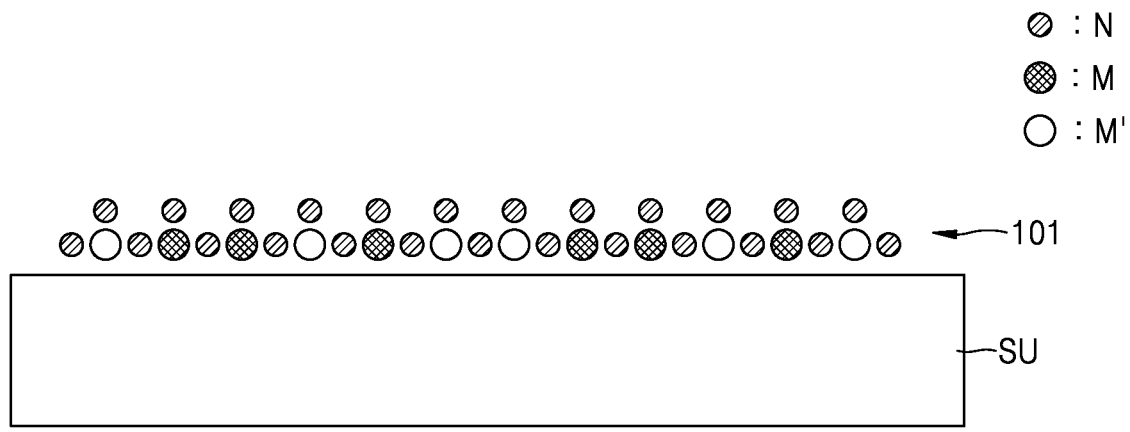

The supply of the nitridant and the reaction based on the nitridant are shown in FIGS. 10F to 10H and may be expressed as chemical Equation (6).

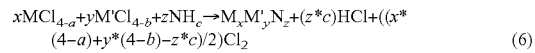

$$xMCl_{4-a} + yM'Cl_{4-b} + zNH_c \rightarrow M_xM'_yN_z + (z*c)HCl + ((x*(4-a) + y*(4-b) - z*c)/2)Cl_2 \quad (6)$$

It may be determined in operation S180 whether a metal nitride film 101 is formed to a desired thickness, and depending on a need, operations S110 to S170 may be repeated. The metal nitride film 101 may be the lower electrode 100 described above.

In an example, after operation S170 of supplying the nitridant to the chamber, heat treatment for removing the halogen element (and/or ligands) remaining as the reaction by-product in the halogen compound may be further performed. The heat-treatment temperature may be about 200° C. to about 1000° C.

The metal nitride film 101 formed according to such an operation has a low content of impurities other than MM'N. The organic ligands included in the source used to form MM'N are almost completely removed, such that the metal nitride film 101 may have few carbon impurities. In the metal nitride film 101 formed according to such a process, carbon impurities of about 1% or less may be included. On the other hand, in an existing method, a ligand or a reaction by-product inevitably remains. As an impurity content increases, the metal nitride film shows a high resistivity and is not suitable to function as an electrode. Depending on an impurity content, the resistivity of the metal nitride film may vary in a range of several hundreds of times. The metal nitride film MM'N having few impurities by being fabricated by a method according to an embodiment may exhibit low resistivity and may be used as a superior electrode material. In an example, the metal nitride film 101 may be the lower electrode 100 shown in FIGS. 1, 6, 7, and 8.

A method of fabricating a lower electrode including a metal nitride according to the present disclosure may not include an operation of directly reacting a metal organic ligand with a nitridant, such that the lower electrode including the metal nitride with better quality may be formed.

Figure 11:
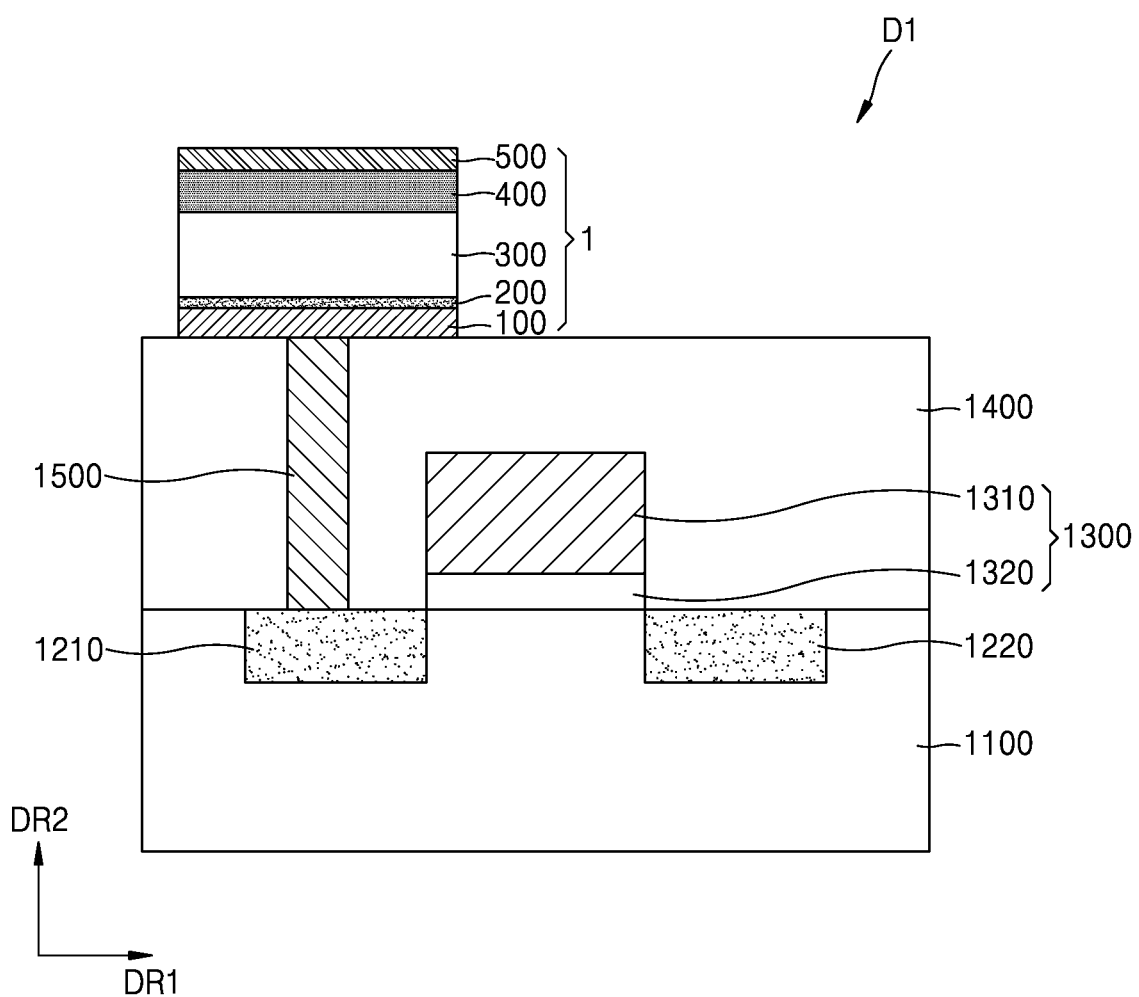
FIG. 11 shows a semiconductor device according to at least one example embodiment.

FIG. 11 is a cross-sectional view of a semiconductor device according to at least one example embodiment. For brevity of a description, descriptions that are substantially the same as the description made with reference to FIG. 1 is omitted. Further, for brevity the following semiconductor device D1 is described in relation to capacitor 1, but any of the embodiments described above may also apply.

Referring to FIG. 11, a semiconductor device D1 including a substrate 1100, a gate structure 1300, an interlayer insulating film 1400, a contact 1500, and the capacitor 1 may be provided. The substrate 1100 may include a semiconductor substrate. For example, the substrate 1100 may include a silicon substrate, a germanium substrate, or a silicon-germanium substrate.

A first source/drain region 1210 and a second source/drain region 1220 may be provided in an upper portion of the substrate 1100. The first source/drain region 1210 and the second source/drain region 1220 may be separated from each other in a first direction DR1 that is parallel to a top surface of the substrate 1100. In at least some embodiments, the first source/drain region 1210 and the second source/drain region 1220 may be formed by injection of impurities to the substrate 1100.

The gate structure 1300 may be provided on the substrate 1100. The gate structure 1300 may be provided between the first source/drain region 1210 and the second source/drain region 1220. The gate structure 1300 may include a gate electrode 1310 and a gate insulating film 1320. The gate electrode 1310 may include a conductive material. For example, the gate electrode 1310 may include a metal and/or polysilicon.

The gate insulating film 1320 may be arranged between the gate electrode 1310 and the substrate 1100. The gate insulating film 1320 may electrically disconnect (or isolate) the substrate 1100 from the gate electrode 1310. The gate insulating film 1320 may include a dielectric material. For example, the gate insulating film 1320 may include, e.g., an Si oxide (e.g., $SiO_2$), an Al oxide (e.g., $Al_2O_3$), and/or a high-permittivity material (e.g., $HfO_2$).

The interlayer insulating film 1400 may be provided on the substrate 1100 to cover the gate structure 1300. The interlayer insulating film 1400 may include an insulating material. For example, the interlayer insulating film 1400 may include an Si oxide (e.g., $SiO_2$), an Al oxide (e.g., $Al_2O_3$), and/or a high-permittivity material (e.g., $HfO_2$).

The capacitor 1 may be provided on the interlayer insulating film 1400. The capacitor 1 may include the lower electrode 100, the lower interfacial film 200, the dielectric film 300, the leakage current reduction film 400, and the upper electrode 500. The lower electrode 100, the lower interfacial film 200, the dielectric film 300, the leakage current reduction film 400, and the upper electrode 500 may be substantially the same as those described with reference to FIG. 1, respectively. Meanwhile, in FIG. 11, the capacitor 1A described with reference to FIG. 6 instead of the capacitor 1 may also be applied.

The contact 1500 may be provided between the lower electrode 100 and the first source/drain region 1210. The contact 1500 may pass through the interlayer insulating film 1400. The contact 1500 may electrically connect the lower electrode 100 to the first source/drain region 1210. The contact 1500 may include a conductive material (e.g., metal).

The leakage current reduction film 400 including the doped AlZrO film may have leakage current blocking characteristics that are similar to (or greater than) those of the undoped AlZrO film, while minimizing reduction of the capacitance of the capacitor 1. Therefore, the stability and reliability of the semiconductor device D1 may be improved.

Figure 12:
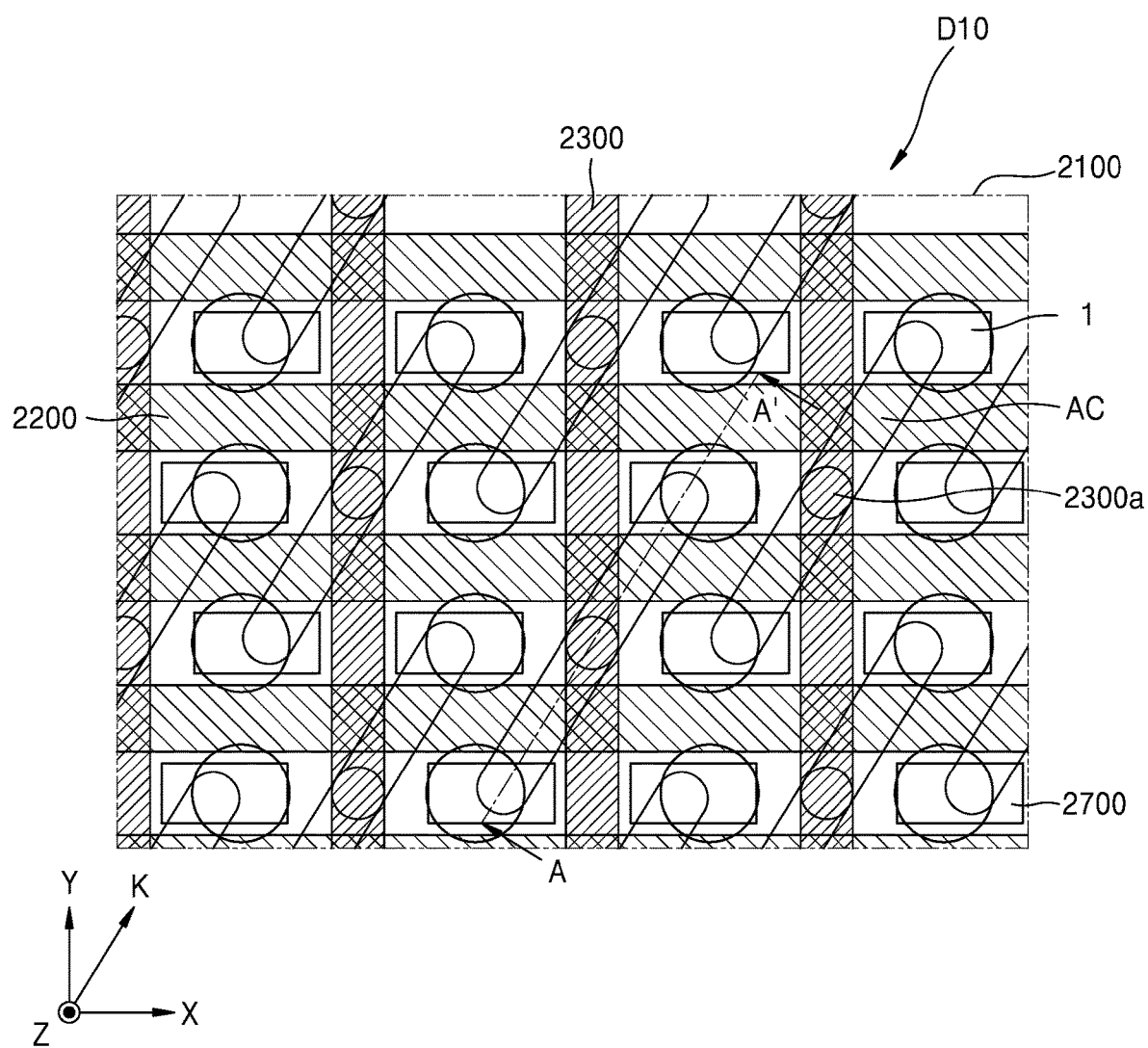
FIG. 12 shows a semiconductor device according to at least one example embodiment.

FIG. 12 shows a semiconductor device D10 according to at least one example embodiment. The semiconductor device D10 has a structure in which a plurality of capacitors 1 and a plurality of field effect transistors are arranged repeatedly.

Referring to FIG. 12, the semiconductor device D10 may include a field effect transistor including a substrate 2100 including a source, a drain, and a channel, and a gate stack 2200, a contact structure 2700 arranged on the substrate 2100 not to overlap the gate stack 2200, and the capacitor 1 arranged on the contact structure 2700, and may further include a bit line structure 2300 electrically connecting a plurality of field effect transistors. Meanwhile, in FIG. 12, the capacitor 1A described with reference to FIG. 6 instead of the capacitor 1 may also be applied.

FIG. 12 shows the semiconductor device D10 where both the contact structure 2700 and the capacitor 1 are repeatedly arranged in an X direction and a Y direction, but the disclosure is not limited thereto. For example, the contact structure 2700 may be arranged in the X direction and the Y direction, and the capacitor 1 may be arranged in a hexagonal shape like a honeycomb structure.

Figure 13:
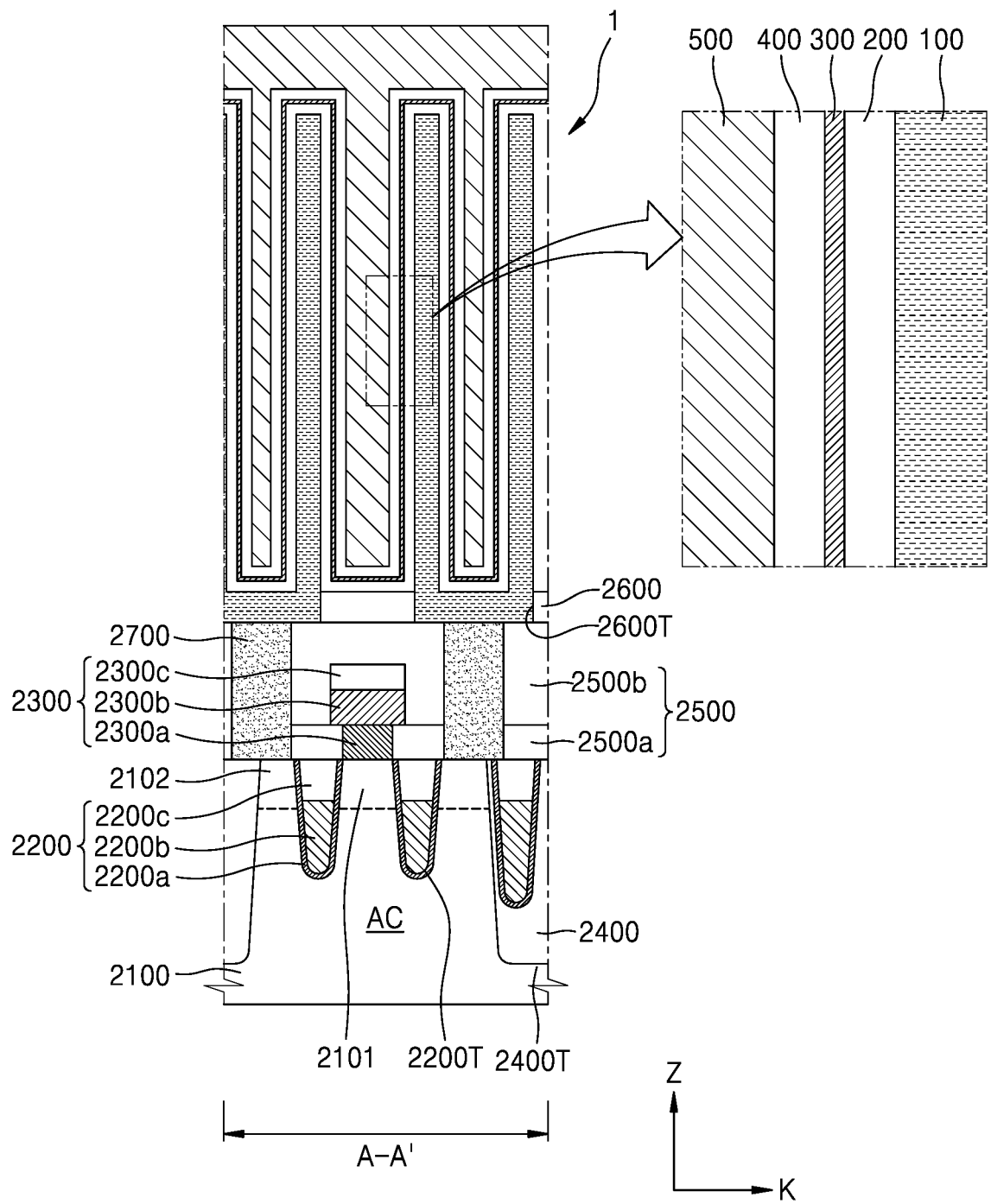
FIG. 13 is a cross-sectional view taken along a line A-A' of FIG. 12 according to at least one embodiment.

FIG. 13 is a cross-sectional view taken along a line A-A' for the semiconductor device D10 of FIG. 12.

Referring to FIG. 13, the substrate 2100 may have a shallow trench isolation (STI) structure including a device isolation film 2400. The device isolation film 2400 may be a single layer including one type of an insulating film or a multi-layer including a combination of two or more types of insulating films. The device isolation film 2400 may include a device isolation trench 2400T in the substrate 2100, and the device isolation trench 2400T may be filled with an insulating material. The insulating material may include, but is not limited to, fluoride silicate glass (FSG), undoped silicate glass (USG), boro-phospho-silicate glass (BPSG), phospho-silicate glass (PSG), flowable oxide (FOX), plasma enhanced tetra-ethyl-ortho-silicate (PE-TEOS), tonen silazene (TOSZ), and/or the like.

The substrate 2100 may further include an active region AC defined by the device isolation film 2400 and a gate line trench 2200T that is parallel to a top surface of the substrate 2100 and arranged to extend in the X direction. The active region AC may have a relatively long island shape having a minor axis and a major axis. The major axis of the active region AC may be arranged along a K direction parallel to the top surface of the substrate 2100. The gate line trench 2200T may be arranged to cross the active region AC to a certain depth from the top surface of the substrate 2100 or to be in the active region AC. The gate line trench 2200T may be arranged inside the device isolation trench 2400T, and the gate line trench 2200T inside the device isolation trench 2400T may have a lower bottom surface than the gate line trench 2200T of the active region AC.

A first source/drain 2101 and a second source/drain 2102 may be arranged in an upper portion of the active region AC in both sides of the gate line trench 2200T.

The gate stack 2200 may be arranged inside the gate line trench 2200T. More specifically, a gate insulating layer 2200a, a gate electrode 2200b, and a gate capping layer 2200c may be sequentially arranged inside the gate line trench 2200T. The gate insulating layer 2200a and the gate electrode 2200b may refer to the foregoing description, and the gate capping layer 2200c may include a silicon oxide, a silicon oxynitride, and/or a silicon nitride. The gate capping layer 2200c may be arranged on the gate electrode 2200b to fill the remaining part of the gate line trench 2200T.

The bit line structure 2300 may be arranged on the first source/drain 2101. The bit line structure 2300 may be arranged to be parallel to the top surface of the substrate 2100 and to extend in the Y direction. The bit line structure 2300 may be electrically connected to the first source/drain 2101, and include a bit line contact 2300a, a bit line 2300b, and a bit line capping layer 2300c that are sequentially stacked on the substrate 2100. For example, the bit line contact 2300a may include polysilicon, the bit line 2300b may include a metal material, and the bit line capping layer 2300c may include an insulating material, such as a silicon nitride, a silicon oxynitride, etc. While it is shown in FIG. 13 as an example that the bit line contact 2300a has a bottom surface of the same level as the top surface of the substrate 2100, the bit line contact 2300a may extend into a recess (not shown) formed to a certain depth from the top surface of the substrate 2100, such that the bottom surface of the bit line contact 2300a may be lower than the top surface of the substrate 2100.

The bit line structure 2300 may further include a bit line intermediate layer (not shown) between the bit line contact 2300a and the bit line 2300b. The bit line intermediate layer may include metal silicide such as tungsten silicide, and/or a metal nitride such as a tungsten nitride. In addition, a bit line spacer (not shown) may be further formed on a sidewall of the bit line structure 2300. The bit line spacer may have a single-layer structure or a multi-layer structure, and may include an insulating material such as a silicon oxide, a silicon oxynitride, or a silicon nitride. The bit line spacer may further include an air space (not shown).

The contact structure 2700 may be arranged on the second source/drain 2102. The contact structure 2700 and the bit line structure 2300 may be arranged on different sources/drains. In at least one embodiment, the contact structure 2700 may have a structure in which a lower contact pattern (not shown), a metal silicide layer (not shown), and an upper contact pattern (not shown) are sequentially stacked on the second source/drain 2102. In addition, the contact structure 2700 may further include a barrier layer (not shown) surrounding a side surface and a bottom surface of the upper contact pattern. For example, the lower contact pattern may include polysilicon, the upper contact pattern may include a metal material, and the barrier layer may include a metal nitride having conductivity.

The capacitor 1 may be electrically connected to the contact structure 2700 and may be arranged on the substrate 2100. Herein, the capacitor 1 may be substantially the same as that described with reference to FIG. 1, and/or the capacitor 1A shown in FIG. 6 may be applied in place of the capacitor 1.

The capacitor 1 may include the lower electrode 100 electrically connected to the contact structure 2700, the upper electrode 500 provided apart from the lower electrode 100, the lower interfacial film 200 provided between the lower electrode 100 and the upper electrode 500, the dielectric film 300, and the leakage current reduction film 400.

An interlayer insulating layer 2500 may be further arranged between the capacitor 1 and the substrate 2100. The interlayer insulating layer 2500 may be arranged in a space between the capacitor 1 and the substrate 2100 where another structure is not arranged. More specifically, the interlayer insulating layer 2500 may be arranged to cover wiring and/or an electrode structure on the substrate 2100, such as the bit line structure 2300, the contact structure 2700, the gate stack 2200, etc. For example, the interlayer insulating layer 2500 may surround a wall of the contact structure 2700. The interlayer insulating layer 2500 may include a first interlayer insulating layer 2500a surrounding the bit line contact 2300a and a second interlayer insulating layer 2500b covering sides and/or top surfaces of the bit line 2300b and the bit line capping layer 2300c. In addition, when the plurality of capacitors 1 are arranged, bottom surfaces of the plurality of lower electrodes 100 may be separated by an etch stopping layer 2600. For example, the etch stopping layer 2600 may include an opening 2600T, and the bottom surface of the lower electrode 100 of the capacitor 1 may be arranged in the opening 2600T.

Figure 14:
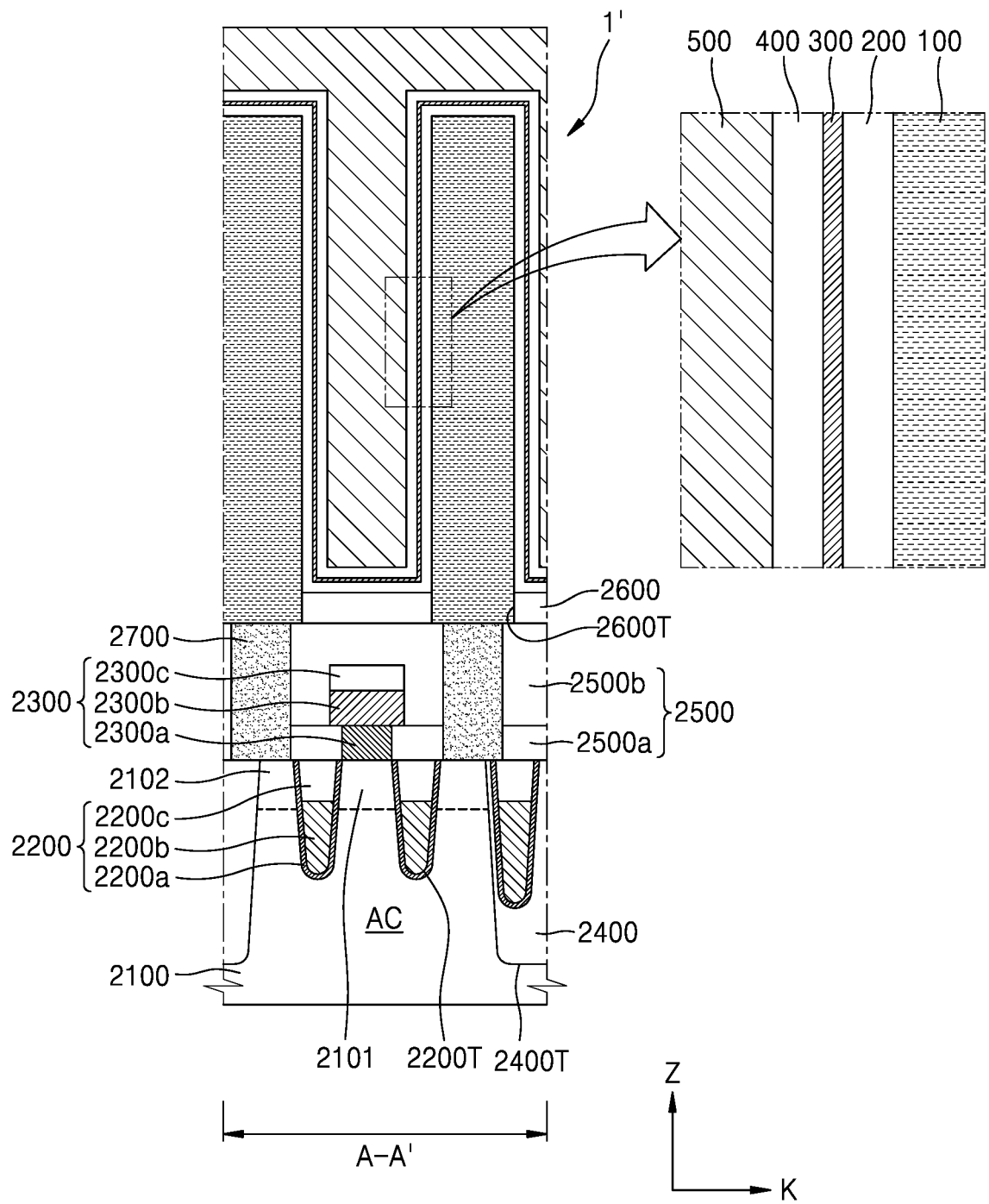
FIG. 14 is a cross-sectional view taken along a line A-A' of FIG. 12 according to at least one embodiment.

The lower electrode 100 may have a cylindrical shape and/or a cup shape with a closed bottom as shown in FIG. 13. Meanwhile, as another example, as in a capacitor 1' shown in FIG. 14, the lower electrode 100 may have a pillar shape such as a cylinder, a rectangular column, or a polygonal column, extending in a vertical direction (Z direction). The capacitor 1' may further include a support (not shown) that prevents the lower electrode 100 from tilting or collapsing, and the support may be arranged on the sidewall of the lower electrode 100.

The semiconductor device D10 may be manufactured by referring to a general method known to this field. For example, the semiconductor device D10 may be manufactured by a method including operations i) to xvi) described below:

i) operation of forming the device isolation trench 2400T in the substrate 2100 and forming the device isolation film 2400 in the device isolation trench 2400T (operation of defining the active region AC by the device isolation film 2400 and/or the device isolation trench 2400T);

ii) operation of filling an inside of the device isolation trench 2400T with an insulating material;

iii) operation of forming the first source/drain 2101 and a second source/drain 2102 on an upper region of the active region AC by injecting impurity ions into the substrate 2100;

iv) operation of forming the gate line trench 2200T in the substrate 2100;

v) operation of forming the gate insulating layer 2200a, the gate electrode 2200b, and the gate capping layer 2200c in the gate line trench 2200T;

vi) operation of forming the first interlayer insulating layer 2500a on the substrate 2100 and forming an opening (not shown) that exposes a top surface of the first source/drain 2101;

vii) operation of forming the bit line structure 2300 electrically connected to the first source/drain 2101 on the opening of vi);

viii) operation of forming the second interlayer insulating layer 2500b that covers the top surface and the side surface of the bit line structure 2300;

ix) operation of forming an opening (not shown) in the first and second interlayer insulating layers 2500a and 2500b to expose a top surface of the second source/drain 2102;

x) operation of forming the contact structure 2700 electrically connected to the second source/drain 2102 on the opening of ix);

xi) operation of forming the etch stopping layer 2600 and a mold layer (not shown) on the second interlayer insulating layer 2500b and the contact structure 2700;

xii) operation of forming an opening (not shown) in the etch stopping layer 2600 and the mold layer (not shown) to expose the top surface of the contact structure 2700;

xiii) operation of forming the lower electrode 100 to cover an inner wall (a bottom surface and a side surface) of the opening of xii);

xiv) operation of removing the mold layer (not shown);

xv) operation of forming the lower interfacial film 200, the dielectric film 300, and the leakage current reduction film 400; and xvi) operation of forming the upper electrode 500 on the leakage current reduction film 400.

A type and/or an order of each operation is not limited, and may be properly adjusted and may be omitted or added. In addition, to form a component in each operation, a deposition process, a patterning process, an etching process, etc., known in this field may be used. For example, an etch-back process may be applied to form an electrode. In operation v), the gate electrode 2200b may be formed by forming a conductive layer on the gate insulating layer 2200a and then removing an upper portion of the conductive layer through an etch-back process. In operation xiii), a structure having a plurality of lower electrodes 100 may be manufactured by forming the lower electrode 100 to cover all of the top surface of the mold layer and the bottom surface and the side surface of the opening, and then removing a portion of the electrode on the top surface of the mold layer through the etch-back process. In another example, a smoothing process may be applied. For example, in operation v), the gate capping layer 2200c may be formed by filling the remaining portion of the gate line trench 2200T with an insulating material and then smoothing the insulating material until the top surface of the substrate 2100 is exposed.

According to another aspect, the above-described capacitors 1 and 1A and semiconductor devices D1 and D10 may be applied to various electronic devices. For example, the above-described capacitors 1 and 1A and/or semiconductor devices D1 and D10 may be applied as logic devices or memory devices in various electronic devices. More specifically, the capacitors 1 and 1A and the semiconductor devices D1 and D10 may be used for arithmetic operations, program execution, temporary data retention, etc., in electronic devices such as mobile devices, computers, laptop computers, sensors, network devices, neuromorphic devices, etc. The capacitors 1 and 1A and the semiconductor devices D1 and D10 according to embodiments may be useful for electronic devices with a large amount of data transmission and continuous data transmission.

Figure 15:
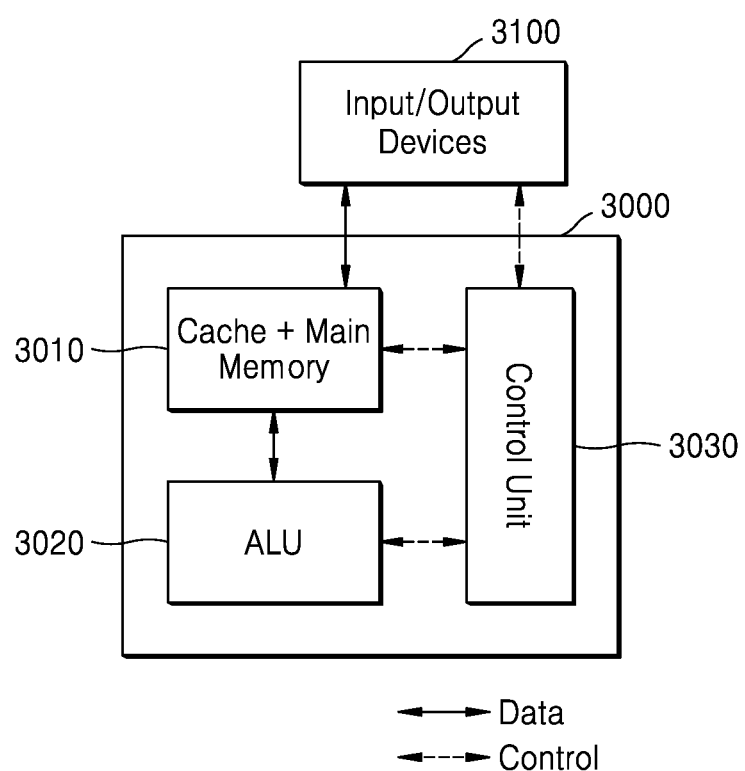
FIG. 15 is a conceptual diagram schematically illustrating a device architecture applicable to an electronic device according to at least one example embodiment.
Figure 16:
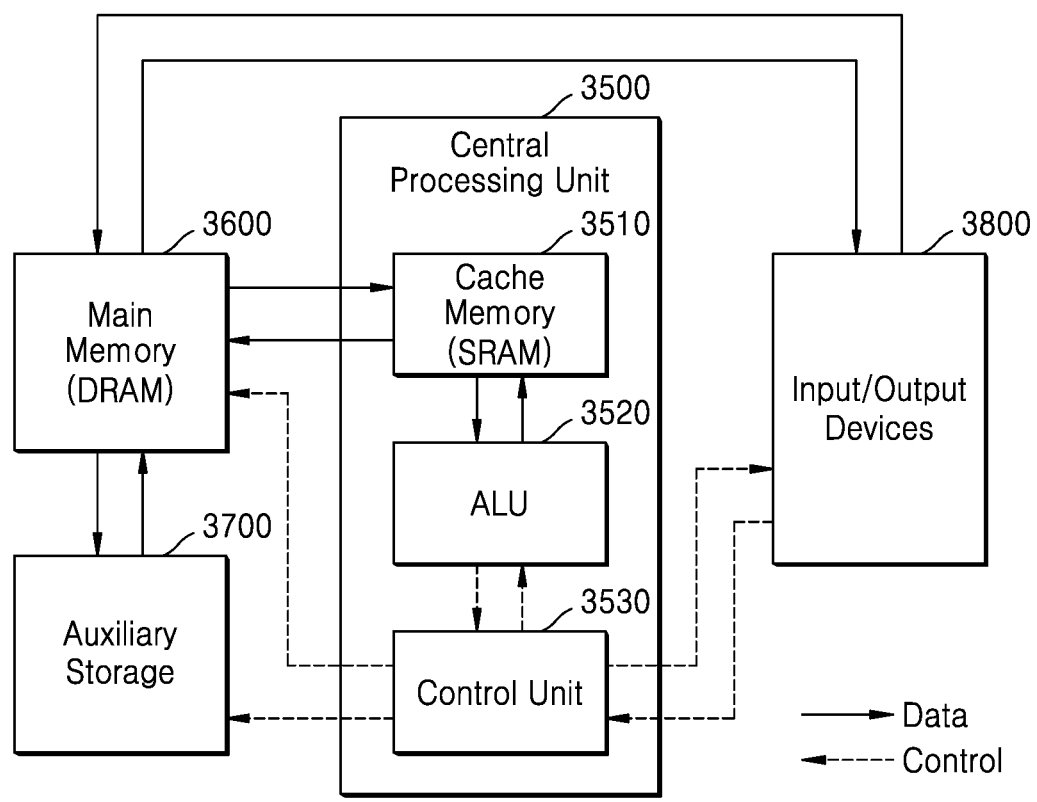
FIG. 16 is a conceptual diagram schematically illustrating a device architecture applicable to an electronic device according to at least one example embodiment.

FIGS. 15 and 16 are conceptual diagrams schematically showing a device architecture applicable to an electronic device according to example embodiments. Unless indicated otherwise, functional elements in the following description and the corresponding blocks shown in the drawings may be implemented in processing circuitry such as hardware, software, or a combination thereof configured to perform a specific function. For example, the processing circuitry more specifically may be and/or include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), electrical components (such as at least one of transistors, resistors, capacitors, logic gates (including at least one of AND gates, OR gates, NOR gates, NAND gates, NOT gates, XOR gates, etc.), and/or the like).

Referring to FIG. 15, a device architecture 3000 may include a memory unit 3010, an arithmetic logic unit (ALU) 3020, and a control unit 3030. The memory unit 3010, the ALU 3020, and the control unit 3030 may be electrically connected to one another. For example, the device architecture 3000 may be implemented as one chip including the memory unit 3010, the ALU 3020, and the control unit 3030. More specifically, the memory unit 3010, the ALU 3020, and the control unit 3030 may directly communicate with one another by being connected through a metal line on-chip. The memory unit 3010, the ALU 3020, and the control unit 3030 may be monolithically integrated on one substrate to constitute one chip. An input/output device 3100 may be connected to the device architecture 3000. The memory unit 3010 may include a main memory and a cache memory. The device architecture 3000 may be an on-chip memory processing unit. Each of the memory unit 3010, the ALU 3020, and/or the control unit 3030 may independently include the above-described capacitor.

Referring to FIG. 16, a cache memory 3510, an ALU 3520, and a control unit 3530 may form a central processing unit (CPU) 3500, and the cache memory 3510 may include static random access memory (SRAM). In addition to the CPU 3500, a main memory 3600 and an auxiliary storage 3700 may be included. The main memory 3600 may include dynamic random access memory (DRAM), and may include the above-described capacitor. Depending on a circumstance, the device architecture may be implemented in a form where computing-unit devices and memory-unit devices are adjacent to each other in one chip, without distinction of sub-units. An input/output may be connected to the main memory 3600.

The above description of embodiments of the technical spirit of the present disclosure provides an example for the description of the technical spirit of the present disclosure. Therefore, the technical spirit of the present disclosure is not limited to the above embodiments, and it is clear that within the technical spirit of the present disclosure, various modifications and changes such as combining and carrying out the above embodiments may be made by those of ordinary skill in the art.

The present disclosure may provide a capacitor with improved leakage current characteristics and capacitance characteristics.

The present disclosure may provide a method of fabricating a capacitor with improved leakage current characteristics and capacitance characteristics.

The present disclosure may provide a semiconductor device including a capacitor with improved leakage current characteristics and capacitance characteristics.

However, effects of the present disclosure are not limited to the above disclosure.

It should be understood that the example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A capacitor comprising:
a lower electrode;
an upper electrode;
a dielectric film between the lower electrode and the upper electrode; and
a leakage current reduction film between the upper electrode and the dielectric film, the leakage current reduction film comprising a doped AlZrO film, and
wherein an ionic radius of a dopant included in the doped AlZrO film is greater than or equal to about 130 picometers (pm).

2. The capacitor of claim 1, wherein the leakage current reduction film comprises zirconium (Zr) of about 75 at % or more among metal atoms except for oxygen (O).

3. The capacitor of claim 1, wherein the dopant comprises at least one of potassium (K), rubidium (Rb), cesium (Cs), strontium (Sr), barium (Ba), neodymium (Nd), samarium (Sm), europium (Eu), francium (Fr), or radium (Ra).

4. The capacitor of claim 1, further comprising:
a lower interfacial film between the lower electrode and the dielectric film,
wherein the lower interfacial film comprises a material expressed as MM'ON, M'O, or M'ON, and
wherein M comprises at least one of beryllium (Be), boron (B), sodium (Na), magnesium (Mg), aluminum (Al), silicon (Si), potassium (K), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), rubidium (Rb), strontium (Sr), yttrium (Y), zirconium (Zr), niobium (Nb), molybdenum (Mo), technetium (Tc), ruthenium (Ru), rhodium (Rh), palladium (Pd), silver (Ag), cadmium (Cd), indium (In), tin (Sn), antimony (Sb), tellurium (Te), cesium (Cs), barium (Ba), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), Ytterbium (Yb), lutetium (Lu), hafnium (Hf), tantalum (Ta), tungsten (W), rhenium (Re), osmium (Os), iridium (Ir), platinum (Pt), gold (Au), mercury (Hg), thallium (Tl), lead (Pb), bismuth (Bi), polonium (Po), francium (Fr), radium (Ra), actinium (Ac), thorium (Th), protactinium (Pa), or uranium (U), and M' comprises at least one of hydrogen (H), lithium (Li), Be, B, N, O, Na, Mg, Al, Si, phosphorus (P), sulfur(S), K, Ca, Sc, Ti, V, Cr, Mn, Fe, Co, Ni, Cu, Zn, Ga, Ge, arsenic (As), selenium (Se), Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, or U.

5. The capacitor of claim 4, further comprising:
an upper interfacial film between the leakage current reduction film and the upper electrode,
wherein the upper interfacial film comprises a material expressed as M'O or M'ON.

6. The capacitor of claim 1, wherein a total thickness of the dielectric film and the leakage current reduction film is about 20 angstrom (Å) to about 80 Å.

7. The capacitor of claim 1, wherein a thickness of the dielectric film is about 1.5 times a thickness of the leakage current reduction film.

8. The capacitor of claim 1, wherein the leakage current reduction film comprises the dopant and Al of about 25% or less in total among metal atoms except for O.

9. The capacitor of claim 8, wherein
the doped AlZrO is represented by $(L_1)nAl_xZr_yO_{(0.5n+1.5x+2y)}$, $(L_2)_mAl_xZr_yO_{(m+1.5x+2y)}$ or $(L_1)_n(L_2)_mAl_xZr_yO_{(0.5n+m+1.5x+2y)}$,
wherein $L_1$ is one of K, Rb, Cs, and Fr, $L_2$ is one of Sr, Ba, and Ra,
wherein x, y, n, and m respectively represent an atomic percentage of the metal atoms in the doped AlZrO, and
wherein $0<(n+x)\leq 0.25$, $0<(m+x)\leq 0.25$, $0<(n+m+x)\leq 0.25$ and $0.75\leq y<1$.

10. The capacitor of claim 1, wherein the dielectric film comprises at least one of $HfO_2$, $ZrO_2$, $CeO_2$, $La_2O_3$, $Ta_2O_3$, or $TiO_2$.

11. The capacitor of claim 1, wherein each of the lower electrode and the upper electrode comprises at least one of TiN, NbN, MoN, CON, TaN, W, Ru, $RuO_2$, $SrRuO_3$, Ir, $IrO_2$, Pt, PtO, SRO($SrRuO_3$), BSRO(($Ba,Sr)RuO_3$), CRO ($CaRuO_3$), LSCO(($La,Sr)CoO_3$), or a combination thereof.

12. The capacitor of claim 1, wherein the lower electrode includes a carbon content of 1% or less.

13. A method of fabricating a capacitor, the method comprising:
forming a lower electrode;
forming a dielectric film on the lower electrode;
forming a leakage current reduction film on the dielectric film, the leakage current reduction film comprising a doped AlZrO film; and
forming an upper electrode on the leakage current reduction film,
wherein an ionic radius of a dopant contained in the doped AlZrO film is greater than or equal to about 130 picometers (pm).

14. The method of claim 13, wherein the forming of the leakage current reduction film comprises
forming a lower $Al_2O_3$ film, a dopant film, a $ZrO_2$ film, and an upper $Al_2O_3$ film on the dielectric film, and
heat-treating the dielectric film, the lower $Al_2O_3$ film, the dopant film, the $ZrO_2$ film, and the upper $Al_2O_3$ film, and
wherein the dopant film comprises an oxide film comprising the dopant.

15. The method of claim 14, wherein
the lower $Al_2O_3$ film is formed to a thickness of about 1 to about 3 angstroms (Å),
the dopant film is formed to a thickness of about 1 to about 2 Å,
the $ZrO_2$ film is formed to a thickness of about 20 to about 100 Å, and
the upper $Al_2O_3$ film is formed to a thickness of about 1 to about 3 Å.

16. The method of claim 13, wherein the leakage current reduction film comprises zirconium (Zr) of about 75 at % or more among metal atoms except for oxygen (O).

17. The method of claim 13, wherein the dopant comprises at least one of potassium (K), rubidium (Rb), cesium (Cs), strontium (Sr), barium (Ba), neodymium (Nd), samarium (Sm), europium (Eu), francium (Fr), or radium (Ra).

18. The method of claim 13, further comprising:
forming a lower interfacial film between the lower electrode and the dielectric film,
wherein the lower interfacial film comprises a material expressed as MM'ON, M'O, or M'ON, and
wherein M comprises at least one of beryllium (Be), boron (B), sodium (Na), magnesium (Mg), aluminum (Al), silicon (Si), potassium (K), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), rubidium (Rb), strontium (Sr), yttrium (Y), zirconium (Zr), niobium (Nb), molybdenum (Mo), technetium (Tc), ruthenium (Ru), rhodium (Rh), palladium (Pd), silver (Ag), cadmium (Cd), indium (In), tin (Sn), antimony (Sb), tellurium (Te), cesium (Cs), barium (Ba), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), Ytterbium (Yb), lutetium (Lu), hafnium (Hf), tantalum (Ta), tungsten (W), rhenium (Re), osmium (Os), iridium (Ir), platinum (Pt), gold (Au), mercury (Hg), thallium (Tl), lead (Pb), bismuth (Bi), polonium (Po), francium (Fr), radium (Ra), actinium (Ac), thorium (Th), protactinium (Pa), and uranium (U), and M' comprises at least one of hydrogen (H), lithium (Li), Be, B, N, O, Na, Mg, Al, Si, phosphorus (P), sulfur(S), K, Ca, Sc, Ti, V, Cr, Mn, Fe, Co, Ni, Cu, Zn, Ga, Ge, arsenic (As), selenium (Se), Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, or U.

19. The method of claim 18, further comprising:
forming an upper interfacial film provided between the leakage current reduction film and the upper electrode,
wherein the upper interfacial film comprises a material expressed as M'O or M'ON.

20. A semiconductor device comprising:
a substrate including a first source/drain region and a second source/drain region in an upper portion of the substrate;
a gate structure between the first source/drain region and the second source/drain region; and
a capacitor on the substrate, the capacitor comprising a lower electrode electrically connected to the first source/drain region, an upper electrode on the lower electrode, a dielectric film between the lower electrode and the upper electrode, and a leakage current reduction film between the upper electrode and the dielectric film,
wherein the leakage current reduction film comprises a doped AlZrO film, and
an ionic radius of a dopant included in the doped AlZrO film is greater than or equal to about 130 picometers (pm).

21. The semiconductor device of claim 20, wherein the leakage current reduction film comprises zirconium (Zr) of about 75 at % or more among metal atoms except for oxygen (O).

22. The semiconductor device of claim 20, wherein the dopant comprises at least one selected from among potassium (K), rubidium (Rb), cesium (Cs), strontium (Sr), barium (Ba), neodymium (Nd), samarium (Sm), europium (Eu), francium (Fr), and radium (Ra).

23. The semiconductor device of claim 20, further comprising:
a lower interfacial film between the lower electrode and the dielectric film,
wherein the lower interfacial film comprises a material expressed as MM'ON, M'O, or M'ON, and
wherein M comprises at least one of beryllium (Be), boron (B), sodium (Na), magnesium (Mg), aluminum (Al), silicon (Si), potassium (K), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), rubidium (Rb), strontium (Sr), yttrium (Y), zirconium (Zr), niobium (Nb), molybdenum (Mo), technetium (Tc), ruthenium (Ru), rhodium (Rh), palladium (Pd), silver (Ag), cadmium (Cd), indium (In), tin (Sn), antimony (Sb), tellurium (Te), cesium (Cs), barium (Ba), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), Ytterbium (Yb), lutetium (Lu), hafnium (Hf), tantalum (Ta), tungsten (W), rhenium (Re), osmium (Os), iridium (Ir), platinum (Pt), gold (Au), mercury (Hg), thallium (Tl), lead (Pb), bismuth (Bi), polonium (Po), francium (Fr), radium (Ra), actinium (Ac), thorium (Th), protactinium (Pa), or uranium (U), and
M' comprises at least one of hydrogen (H), lithium (Li), Be, B, N, O, Na, Mg, Al, Si, phosphorus (P), sulfur(S), K, Ca, Sc, Ti, V, Cr, Mn, Fe, Co, Ni, Cu, Zn, Ga, Ge, arsenic (As), selenium (Se), Rb, Sr, Y, Zr, Nb, Mo, Tc, Ru, Rh, Pd, Ag, Cd, In, Sn, Sb, Te, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, Fr, Ra, Ac, Th, Pa, or U.

24. The semiconductor device of claim 23, further comprising:
an upper interfacial film between the leakage current reduction film and the upper electrode,
wherein the upper interfacial film comprises a material expressed as M'O or M'ON.

25. The semiconductor device of claim 20, wherein a total thickness of the dielectric film and the leakage current reduction film is about 20 angstroms (Å) to about 80 Å.

26. The semiconductor device of claim 20, wherein a thickness of the dielectric film is about 1.5 times a thickness of the leakage current reduction film.

27. The semiconductor device of claim 20, wherein the leakage current reduction film comprises the dopant and Al at about 25% or less in total among metal atoms included in the leakage current reduction film.

* * * * *